US012326240B1

(12) United States Patent
Wells et al.

(10) Patent No.: US 12,326,240 B1
(45) Date of Patent: Jun. 10, 2025

(54) SELECTIVELY ATTACHABLE LIGHTING DEVICES AND METHODS

(71) Applicant: SureFire, LLC, Fountain Valley, CA (US)

(72) Inventors: William Wells, Costa Mesa, CA (US); Andrew Castañeda, Anaheim, CA (US)

(73) Assignee: SureFire, LLC, Fountain Valley, CA (US)

(*) Notice: Subject to any disclaimer, the term of this patent is extended or adjusted under 35 U.S.C. 154(b) by 0 days.

(21) Appl. No.: 18/636,116

(22) Filed: Apr. 15, 2024

(51) Int. Cl.

| | |
|---|---|
| ***F21V 19/00*** | (2006.01) |
| ***F21V 15/01*** | (2006.01) |
| ***F21V 21/088*** | (2006.01) |
| ***F21V 29/74*** | (2015.01) |
| ***F21V 33/00*** | (2006.01) |
| ***H05B 47/17*** | (2020.01) |

(52) U.S. Cl.
CPC .......... *F21V 19/0035* (2013.01); *F21V 15/01* (2013.01); *F21V 21/0885* (2013.01); *F21V 29/74* (2015.01); *F21V 33/0076* (2013.01); *H05B 47/17* (2020.01)

(58) Field of Classification Search
CPC . F21V 15/01–015; F21V 19/003–0055; F21V 21/088–0885; F21V 29/74–767; F21V 33/00; F21V 33/0076
See application file for complete search history.

(56) References Cited

U.S. PATENT DOCUMENTS

2007/0125224 A1* 6/2007 Thomas .................... F41H 5/08
89/36.07

* cited by examiner

*Primary Examiner* — Jason M Han
(74) *Attorney, Agent, or Firm* — Haynes and Boone, LLP

(57) ABSTRACT

A lighting device for a dynamic securement on tactical equipment and corresponding methods are disclosed. The lighting device may include a housing with a channel defined by first and second opposed surfaces of the housing, where the channel is configured to receive a mounting member therein. The lighting device may further include one or more fasteners extending from the first surface and/or the second surface and configured to bias against the mounting member to secure the mounting member in the channel. Lighting device may further include an optical assembly secured to the housing and comprising a light source. Additional devices and methods are also provided.

20 Claims, 30 Drawing Sheets

SELECTIVELY ATTACHABLE LIGHTING DEVICES AND METHODS

CROSS-REFERENCE TO RELATED APPLICATIONS

This application is related to U.S. Design patent application Ser. No. 29/937,495 filed Apr. 15, 2024 entitled "LIGHTING DEVICE" which is hereby incorporated by reference in its entirety.

TECHNICAL FIELD

The present invention relates generally to lighting devices and, more specifically, to selectively attachable lighting devices and related methods.

BACKGROUND

Lighting devices are commonly used in tactical situations, such as combat, training, emergency actions, and the like. However, lighting devices may be easily damaged when mounted to equipment during such situations, which can be costly and hazardous.

Furthermore, such lighting devices often have restricted dimensions such that different lights may be required for each different type of equipment used during tactical situations. These factors can significantly limit reliability, ease of use, and cost effectiveness of such devices. Thus, there is a need for systems and methods to provide adaptive alternatives to lighting devices used in conjunction with tactical equipment.

SUMMARY

A lighting device is provided which may be selectively attached to a mounting member (e.g., at least a portion of a piece of tactical equipment). The lighting device may be remotely activated in response to user-actuated controls, such as by a communicatively connected tape switch assembly and/or an actuator of an interchangeable tail cap. Related methods of operation are also provided.

Methods, devices, and systems are described herein for a selectively attachable lighting device providing a dynamic fit on various types of equipment and durability. For instance, lighting device may fit a wide variety of equipment due to interchangeability of a channel of the lighting device and due to mobility of one or more fasteners of the lighting device. In some embodiments, the lighting device may include a housing providing the channel. The channel may be defined by a first and second surface of the housing and configured to receive a mounting member. The mounting member may include at least a portion of a piece of equipment, where the equipment may include, for example, a tactical shield (e.g., a ballistic shield). In one or more embodiments, the lighting device includes one or more fasteners extending from the first surface and configured to bias against the mounting member to bias the mounting member against the second surface, or any attachments on the second surface, to selectively secure the mounting member in the channel. In various embodiments, the lighting device includes an optical assembly, which may be secured to the housing and include a light source configured to illuminate a scene (e.g., at least a portion of an environment).

In various embodiments, the lighting device may include a switch assembly. The switch assembly may include a switch configured to selectively adjust a mode of operation of the light source, where the switch is disposed within a casing. In some embodiments, the casing may be configured to attached to the piece of equipment on a second mounting member of the equipment.

In one or more embodiments, a lighting device is provided. The lighting device includes a housing having a channel defined by first and second opposed surfaces of the housing, where the channel is configured to receive a mounting member therein. Lighting device further includes one or more fasteners extending from the first surface and/or the second surface and configured to bias against the mounting member to secure the mounting member in the channel. The lighting device further includes an optical assembly secured to the housing and including a light source.

In one or more embodiments, a method is provided. The method includes disposing a mounting member in a channel of a housing of a lighting device, where the channel is defined by first and second opposed surfaces of the housing. The method further includes extending one or more fasteners from the first surface and/or the second surface to bias against the mounting member to secure the mounting member in the channel, where the lighting device includes an optical assembly secured to the housing and includes a light source.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
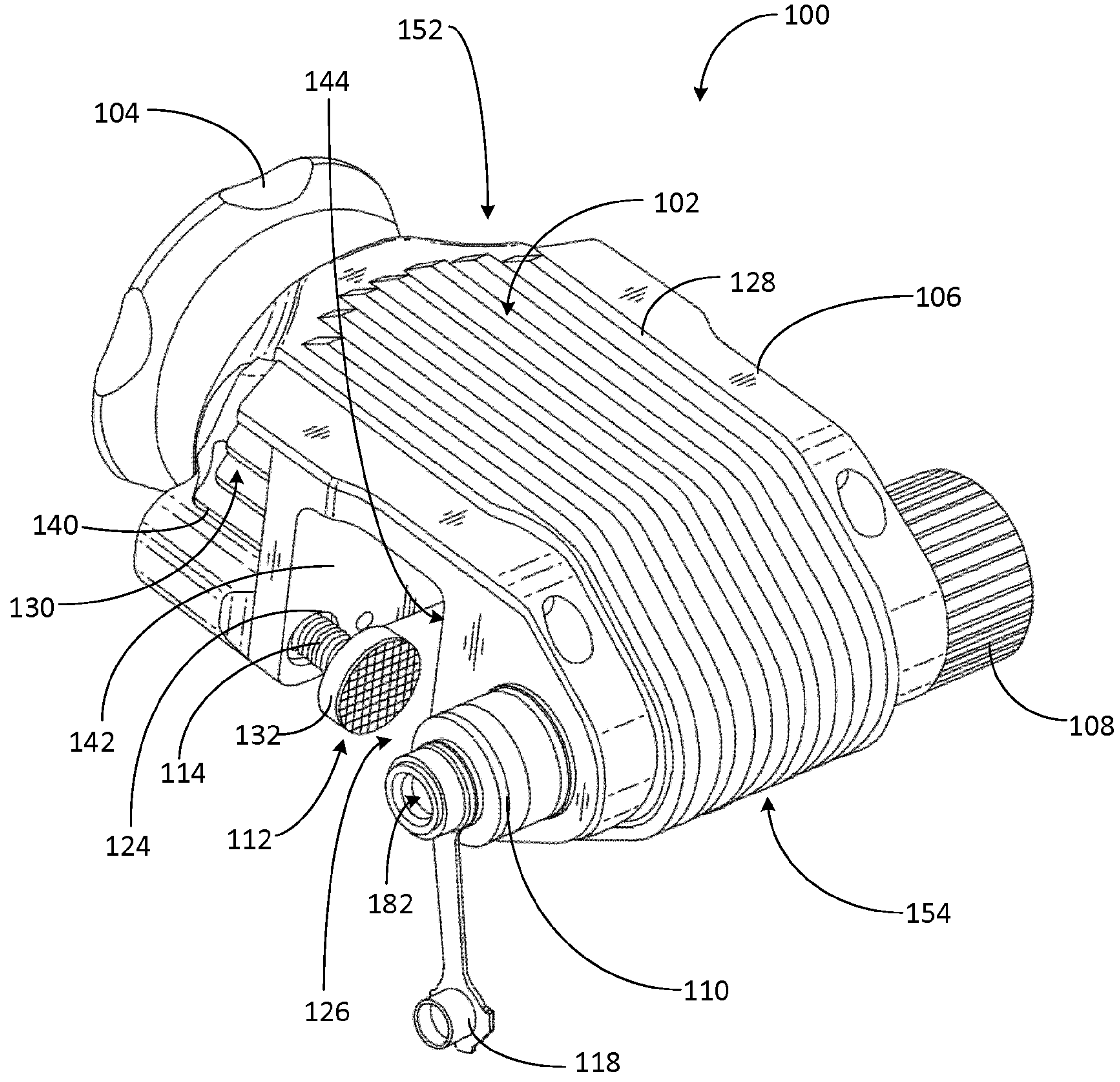
FIGS. 1-8 illustrate various views of a lighting device in accordance with several embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Methods and systems are described herein for providing selectively attachable lighting devices, systems, and methods. In accordance with various embodiments provided herein, a rugged lighting device may be implemented to selectively attach to various types of tactical equipment, such as a ballistic shield. For instance, the lighting device may include a housing defining a channel, where a mounting member (e.g., at least a portion of a piece of tactical equipment) may be received by the channel and then secured within the channel using one or more adjustable fasteners of the lighting device. The channel may be defined by first and second opposed surfaces of the housing, where the channel is configured to receive a mounting member therein. The lighting device may further include one or more fasteners extending from the first surface and/or the second surface and configured to bias against (e.g., contact, abut, or apply a force to) the mounting member to secure the mounting member in the channel. The lighting device may include an optical assembly secured to the housing that includes at least a light source.

In some embodiments, lighting device may include an equipment-mountable lighting device providing convenient access to user controls (e.g., a communicatively connected tape switch assembly or tail cap actuator) for selectively configuring (e.g., adjusting) the operation of the lighting device. For example, such user controls may be used to operate the switching of one or more light sources of the lighting device as well as the brightness and wavelengths of light emitted by the one or more light sources of the lighting device. In one embodiment, a light source may be implemented with one or more light emitting diodes (LEDs) which may be selectively activated and selectively dimmed to provide light of different wavelengths. Light sources other than LEDs may be used in other embodiments.

In one or more embodiments, the lighting device and/or tape switch assembly may be used in any desired combination with the various features identified in the present disclosure to provide a lighting system. In certain embodiments, such a lighting system may be particularly suited for use in tactical and combat environments (e.g., for mounting on tactical equipment or the like). In other embodiments, the lighting system may be used in any desired environment and for any desired application.

Figure 2:
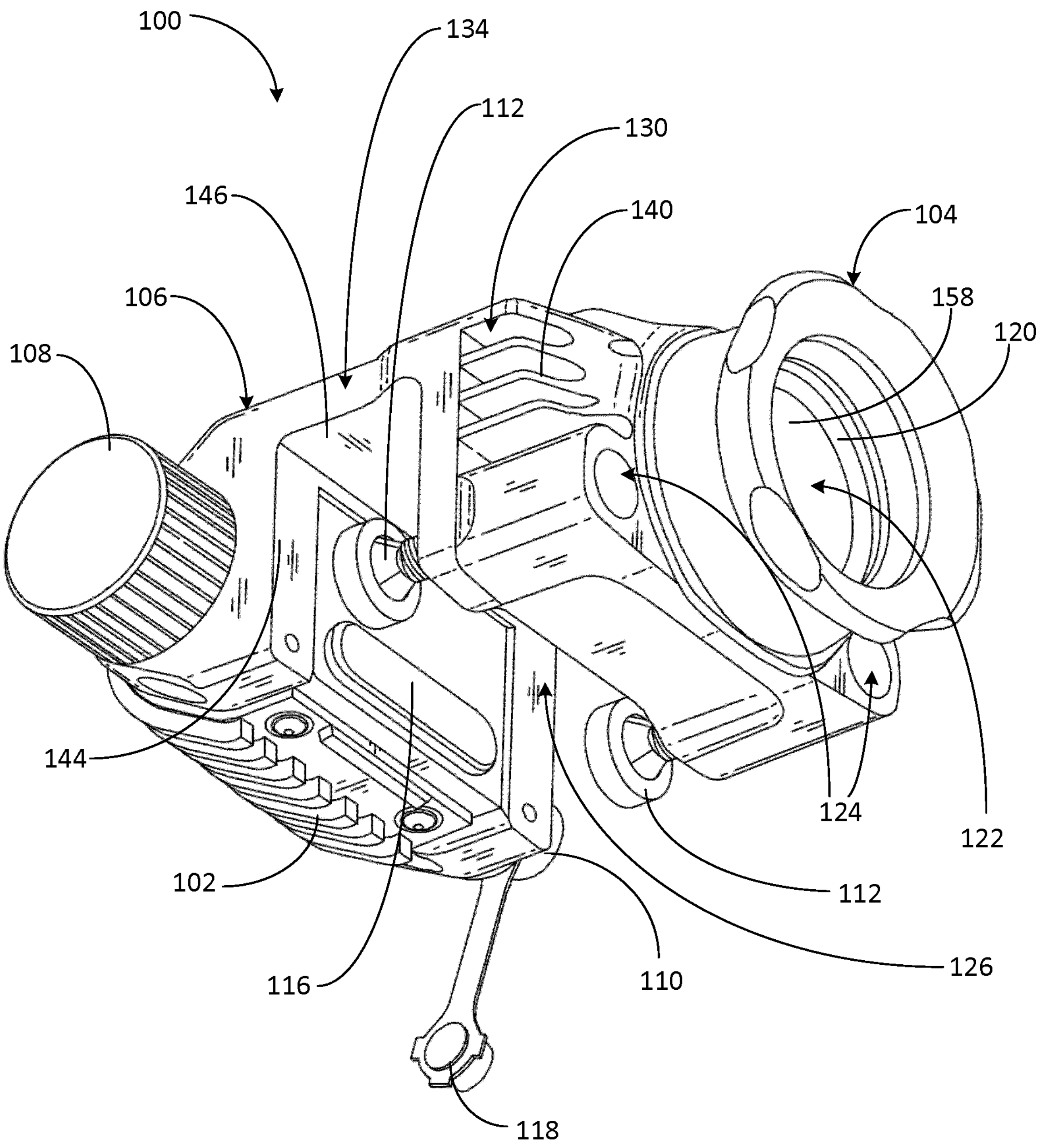
Figure 3:
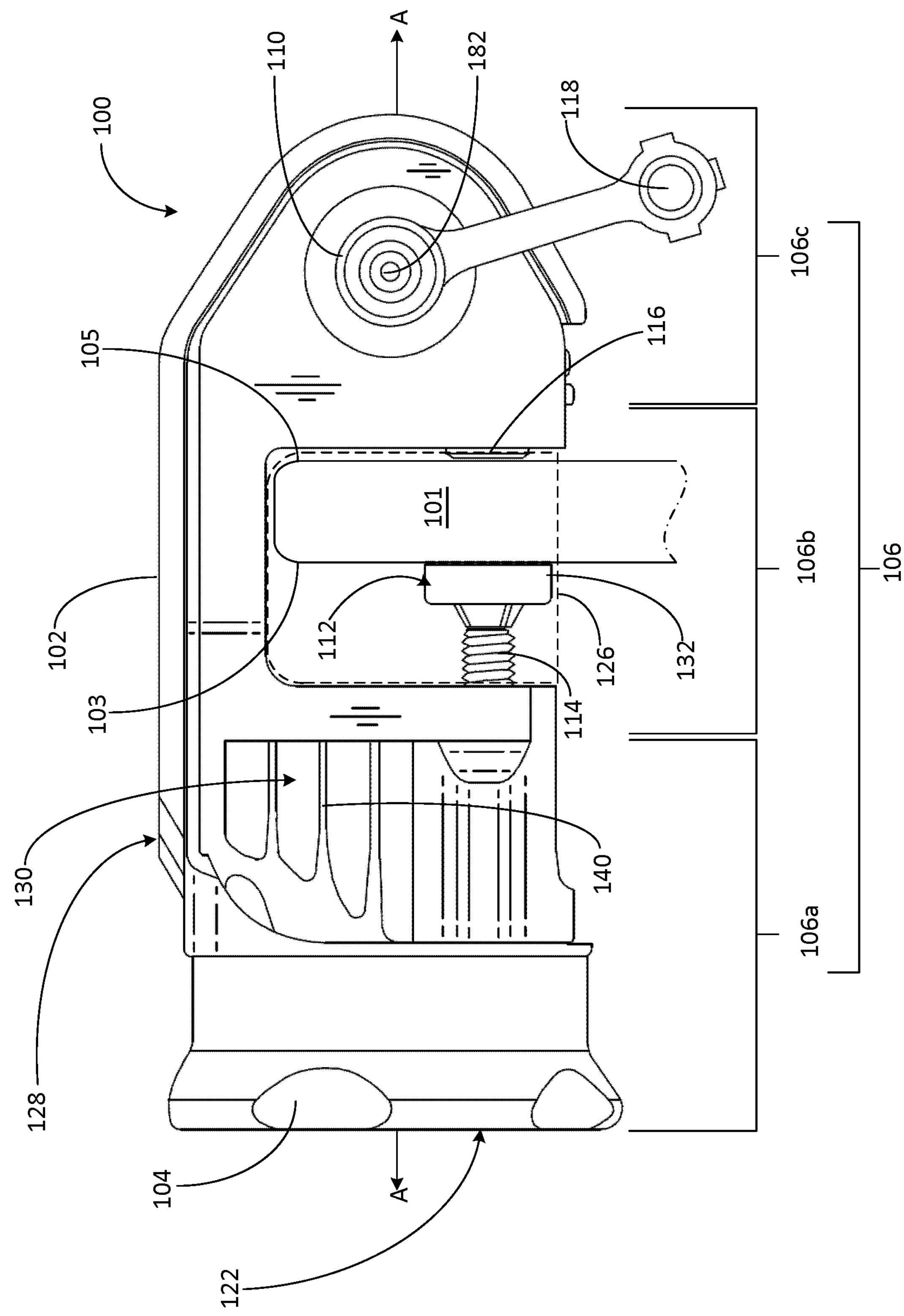
Figure 4:
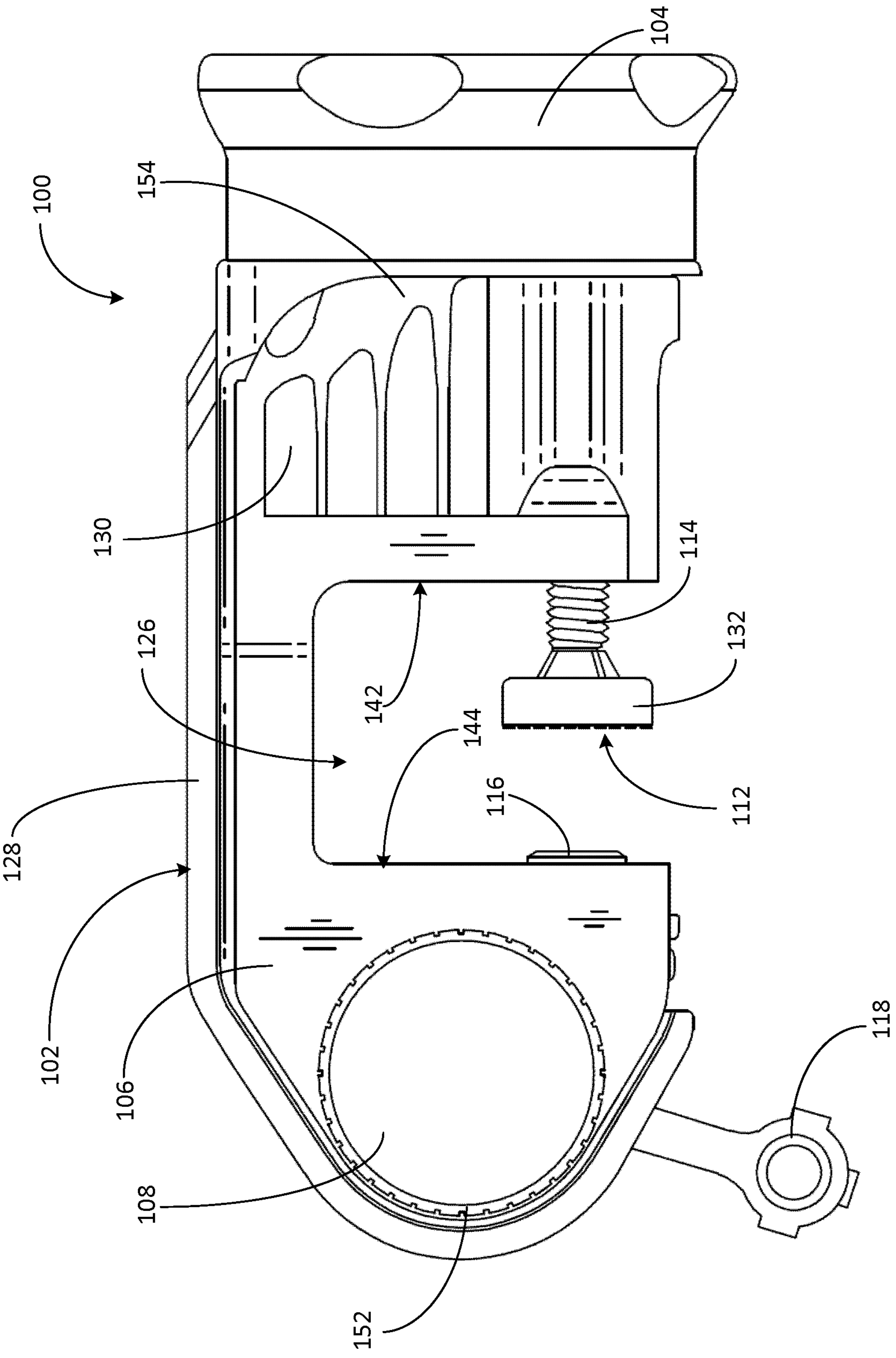
Figure 5:
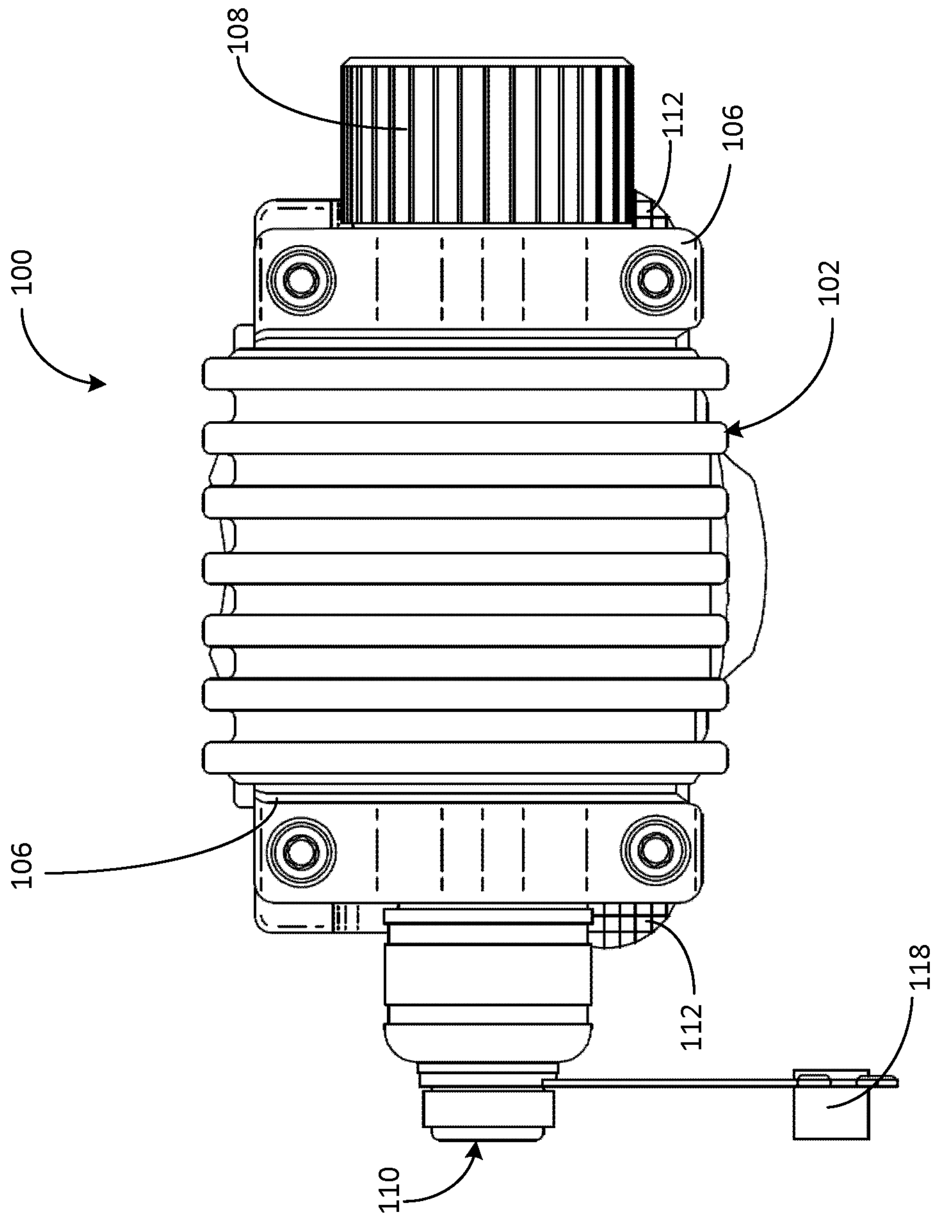

Referring now to the drawings wherein the showings are for purposes of illustrating embodiments of the present disclosure, and not for purposes of limiting the same, FIGS. 1-8 illustrate a selectively attachable lighting device 100 (also referred to herein as a "lighting device") in accordance with several embodiments of the present disclosure. Lighting device 100 may include a housing 106. Housing 106 may include a central longitudinal axis A that extends from a front portion 106*a* to a rear portion 106*c* of housing 106, as shown in FIG. 3. Housing 106 may include a channel 126 defined by a first surface 142 and a second surface 144 of housing 106. In some embodiments, channel 126 may be defined by first surface 142, second surface 144, and an upper surface 146 of housing 106, as shown in FIG. 2. In some embodiments, channel 126 may be defined by a center portion 106*b* of housing 106, as discussed further herein. Channel 126 may be configured to receive a mounting member 101 therein, as shown in FIG. 3. In various embodiments, first and second surfaces 142, 144 may be opposed from each other. In some embodiments, first and second surfaces 142, 144 may be substantially parallel relative to each other. In other embodiments, first and second surfaces 142,144 may be nonparallel, or angled, relative to each other. In some embodiments, first and second surfaces 142,144 may be substantially orthogonal relative to longitudinal axis A of lighting device 100. In other embodiments, first and second surfaces 142,144 may be angled relative to longitudinal axis A of lighting device 100. First and second surfaces 142,144 may include planar surfaces. In other embodiments, first and second surfaces 142,144 may include arcuate surfaces. In other embodiments, first and second surfaces 142, 144 may include irregular surfaces. In other embodiments, first and second surfaces 142,144 may include surfaces shaped to be complementary to one or more surfaces of a mounting member 101 (shown in FIG. 3).

Still referring to FIGS. 1-8, housing 106 may be composed of various materials. For instance, housing 106 may be composed of metal (e.g., aluminum, anodized aluminum alloy, steel, iron, brass, metal alloy, and the like), fiberglass, polymer (e.g., Nitrolon®, plastic, rubber, and the like), glass, and/or the like. For example, and without limitation, housing 106 may be composed of an aluminum alloy for increased durability (e.g., impact toughness and corrosion resilience).

In several embodiments, housing 106 may include a monolithic structure. For instance, housing 106 may include a singular component constructed using one or more various techniques, such as a mold pour, additive manufacturing, subtractive manufacturing, and/or the like. In some embodiments, upper surface 146 may include an underside of a bridge 144 of center portion 106*b* that connects front portion 106*a* and rear portion 106*c*. In other embodiments, housing 106 may include a modular housing having a plurality of components. For instance, housing 106 may include a modular housing having two components, where the modular housing includes front portion 106*a* that secures to an optical assembly 122 (shown in FIG. 2) of lighting device 100 and center portion 106*b* that includes channel 126 (shown in FIG. 3). In another instance, housing 106 includes a three-component housing, where the modular housing includes front portion 106*a* that secures to an optical assembly 122, opposing rear portion 106*c*, and center portion 106*b* that includes channel 126, wherein center portion 106*b* may be disposed between front portion 106*a* and rear portion 106*c*. As understood by one of ordinary skill in the art, modular housing may include any number of components.

Housing 106 being modular may facilitate interchangeability of one or more portions of housing 106. For instance, in one or more embodiments, center portion 106*b* may be configured to be selectively replaced to adjust a size and/or shape of channel 126. For example, a first center portion of housing 106 may include a first channel having a first shape and/or size (e.g., a first set of dimensions). First center portion may be removed from housing 106 and replaced by a second center portion of housing 106 that includes a second channel having a second shape and/or size (e.g., a second set of dimensions). Interchangeability of center portion allows for versatility in the use of lighting device 100 so lighting device 100 may be mounted to various types of mounting members. As previously mentioned, channel 126 may include various shapes and sizes. For example, channel 126 may be rectangular, as shown in at least FIGS. 1-8, triangular, dome-shaped, and/or any other shape. In various embodiments, other portions of housing 106 may be replaced. For instance, front portion may be interchanged to provide various types of optical assemblies.

In one or more embodiments, portions of housing 106 (e.g., front portion 106*a*, center portion 106*b*, and/or rear portion 106*c*) may be attached to each other using various mechanisms. For example, and without limitation, portions of housing 106 may be attached to each other using, one or more fasteners (e.g., screws, pins, nails, clamps), adhesives, or the like. Furthermore, one or more electrical wires traversing through one or more portions of housing 106 may additionally provide structural support by tethering the one or more portions together.

Still referring to FIGS. 1-8, housing 106 may include one or more heat sinks 130. As shown in FIG. 3, front portion 106*a* may include heat sink 130. In some embodiments, heat sink 130 may include a first heat sink and a second heat sink, where the first and second heat sinks are positioned on opposing sides of the optical assembly (e.g., the lens, or window, of the optical assembly). Heat sink 130 may operate as a heat sink for one or more light sources of optical assembly 122 and/or one or more printed board circuits (PCBs) of optical assembly 122. In various embodiments, heat sink 130 may be configured to dissipate heat from one or more light sources to other parts of lighting device 100 and to ambient air (e.g., external environment).

As shown in FIG. 3, heat sink 130 may include one or more fins 140 (e.g., a plurality of fins 140) configured to operate as heat sinks for lighting device 100. Fins 140 may include raised surfaces relative to surrounding surfaces of housing 106 that have gaps disposed therebetween. In some embodiments, fins 140 may include a first and second set of fins 140 on opposing sides of lens 120 of optical assembly 122, as shown in FIG. 2. In one or more embodiments, one or more fins 140 may be substantially parallel relative to each other, as shown in FIGS. 1-8. In other embodiments, one or more fins 140 may be nonparallel relative to each other. In some embodiments, fins 140 may be separate components from housing 106 that may be secured to housing 106. In other embodiments, fins 140 may be an integrated component of housing 106 (e.g., a feature of front portion 106*a*). In several embodiments, heat sink 130 may be disposed on front portion 106*a* of housing 106 and extend the entire height of front portion 106*a*. In other embodiments, heat sink 130 may only extend along a select section of front portion 106*a* (e.g., approximately half the height of front portion 106*a*, as shown in FIG. 3). Fins 140 may be various sizes and shapes. For instance, each fin may be the same size. In other embodiments, one or more fins may be a different size relative to the other fins. In some embodiments, fins 140 may provide a beveled surface of front portion 106*a*. As understood by one of ordinary skill in the art, though four fins are shown for each heat sink, each heat sink of lighting device may include any number of fins appropriate for implementation.

As shown in FIG. 1, in one or more embodiments, lighting device 100 may include a cover 102 secured to a second end 154 (e.g., rear portion 106*c*) of housing 106 and configured to wrap from second end 154 (e.g., rear portion 106*c*) to a first end 152 (e.g., front portion 106*a*) of housing 106. Cover 102 may then be wrapped about housing 106, where a bezel guard 104 may be pulled over at least a portion of optical assembly 122, as discussed further below herein. Cover 102 may be attached to second end 154 using an attachment component, such as screws 150.

Cover 102 may wrap around at least a portion of housing 106 and enclose at least a portion of optical assembly 122 to protect optical assembly 122. For instance, as shown in FIG. 2, cover 102 may include a sacrificial lens 158 (e.g., secondary lens) disposed between optical assembly 122, such as a lens of optical assembly 122, and an external environment. In various embodiments, sacrificial lens 158 and the lens of optical assembly 122 may be composed of various materials, such as, for example, glass, polycarbonate, borosilicate glass, BOROFLOAT®, and the like. For example, and without limitation, sacrificial lens 158 may be composed of polycarbonate to protect a BOROFLOAT® lens of optical assembly 122, which may be prone to breakage during use of a mounting member (e.g., breakage of an unprotected optical assembly lens may occur if a simunition (SIM) round strikes the lighting device during tactical training procedures).

In other embodiments, cover 102 may include bezel guard 104 that extends laterally and/or longitudinally away from optical assembly 122. In some embodiments, bezel guard 104 may include a frustum-shaped (e.g., a truncated cone) bezel guard that extends radially and at angle from sacrificial lens 158. Bezel guard 104 may provide protection of sacrificial lens 158 and/or lens 120 of optical assembly 122. For example, bezel guard 104 may prevent sacrificial lens 158 and/or lens 120 from directly striking the ground if lighting device, or the mounting member lighting device is secured to, is dropped by a user.

Cover 102 may be composed of various materials. For instance, cover 102 may be composed of an elastomeric material such that cover 102 may be flexible and thus able to wrap about housing 106 while also providing a protective layer protecting housing 106 and/or optical assembly 122 from the external environment. In one or more embodiments, and without limitation, cover 102 may be composed of a polymer, rubber, neoprene, Santoprene®, fiberglass, and/or the like. In various, embodiments, cover 102 may include a surface treatment or texture. For instance, cover 102 may include one or more ridges configured to protect housing 106 from, for example, impact forces (e.g., absorb impact forces). Ridges 128 may provide a buffer between the external environment and housing 106. For instance, during use of lighting device on a mounting member, such as a ballistic shield, the ballistic shield may be dropped. Cover 102 may prevent or reduce damaged to housing 106 when lighting device 100 strikes the ground after being dropped.

As shown in FIG. 3, channel 126 may be defined by first and second opposed surfaces 142,144 of housing 106, where channel 126 is configured to receive mounting member 101 therein. In various embodiments, mounting member 101 may include at least a portion of equipment (e.g., tactical equipment), wherein the equipment may include, for example, a mobile structure (e.g., vehicle), a weapon system (e.g., firearm), a protection device (e.g., shield), or any other device or system used for tactical purposes. In some embodiments, the mounting member 101 may include a portion of a ballistic shield such that the one or more fasteners selectively secure the lighting device to the portion (e.g., edge) of the ballistic shield to provide dynamic and durable lighting during use of the ballistic shield. For instance, mounting member 101 may include an upper edge of the ballistic shield, where lighting device 100 may be selectively secured to the upper edge to provide illumination of a scene while a user holds the ballistic shield, as discussed further in FIGS. 21A and 21B. Often conventional shields have illumination located on a central area of the shield. Lighting device 100 being configured to be secured to an edge (e.g., an upper edge) of the ballistic shield may provide the advantage of the user being able to lead with the shield around a corner to provide maximized illumination of an environment with minimized exposure of the shield and/or user to potential dangers within the environment. Furthermore, not having lighting device located centrally on the shield prevents the light from being reflected off surrounding near surfaces and illuminating and/or blinding the user.

Still referring to FIGS. 1-8, in one or more embodiments, lighting device 100 may include one or more fasteners 112 extending from first surface 142 and/or second surface 144, where one or more fasteners 112 may be configured to bias against mounting member 101 to secure mounting member 101 in channel 126. For instance, a first set of one or more fasteners 112 may extend from first surface 142 and a second set of fasteners may extend from second surface 144, where first set of one or more fasteners may bias against a first surface 103 of mounting member 101 and second set of one or more fasteners may bias against a second surface 105 of mounting member 101 such that mounting member 101 may be clamped (e.g., clamping or compression) between first set and second set of one or more fasteners. In some embodiments, one or more fasteners 112 may extend from first surface 142 and/or second surface 144 and may be configured to bias against mounting member 101 to bias the mounting member against an opposing surface, such as second surface 144 and/or first surface 142, respectively. For instance, and without limitation, one or more fasteners 112 may extend from first surface 142 and be configured to bias against first surface 103 of mounting member 101 to bias mounting member 101 against, for example, second surface 144 (e.g., second surface 105 of mounting member 101 biases against second surface 144) to selectively secure mounting member 101 in channel 126. In another instance, one or more fasteners 112 may extend from second surface 144 and be configured to contact mounting member 101 to bias mounting member 101 against first surface 142 to selectively secure mounting member 101 in channel 126. In other embodiments, one or more fasteners 112 may extend from each of first surface 142 and second surface 144 to clamp mounting member 101 between two or more fasteners and secure mounting member 101 in channel 126. In various embodiments, first surface 142 and/or second surface 144 may have an elongated pad disposed thereon and configured to contact a side of mounting member 101 to secure mounting member 101 in channel 126, as discussed further below herein.

In some embodiments, lighting device 100 may have a clamp assembly that includes one or more fasteners 112, where one or more fasteners 112 provides a compressive force on mounting member 101 to secure lighting device 100 to mounting member 101. The compressive force may be applied by one or more fasteners 112 translating relative to housing 106 toward mounting member 101. In various embodiments, one or more fasteners 112 may translate in a direction substantially parallel to longitudinal axis A. In other embodiments, one or more fasteners 112 may translate in a direction angled relative to longitudinal axis A.

In various embodiments, one or more fasteners 112 may each include a threaded interface configured to engage a complementary threaded interface of an insert 924 (shown in FIG. 9), which may be disposed within a corresponding bore 124 of housing 106 (shown in FIG. 2). For example, bore 124 may include a substantially smooth surface, and insert 924 may be configured to be slidably disposed within bore 124. Once insert 924 is fixed within bore 124, stem 114 may engaged a complementary threaded interface of insert 924 and translate through insert 924 in response to a rotation, moveably securing fastener 112 within housing 106.

In other embodiments, one or more fasteners 112 may each include a threaded interface (e.g., a stem 114 of fastener 112 including a plurality of threads) configured to engage a complementary threaded interface of corresponding bore 124 of housing 106. For instance, fastener 112 may be at least partially disposed within bore 124 of front portion 106*a* and translate within bore by a rotation of fastener 112. For instance, in one or more nonlimiting embodiments, fastener 112 may include a screw having threads. Housing 106 may include one or more screw receptacles (e.g., threaded bores) that may receive a corresponding screw, where each screw may at least partially protrude from a surface (e.g., first or second surface 142,144) of housing 106 and may be configured to be threaded through the corresponding screw receptacle of the one or more screw receptacles. Thus, each screw may be configured to translate within their corresponding screw receptacle in response to a rotation by a user about an axis of the screw. For instance, rotation in a first direction may translate screw in a first direction relative to housing 106 to move a first end of the screw toward an opposing surface (e.g., second or first surface of channel) and/or a mounting member disposed within the channel, securing lighting device to the mounting member A rotation in a second direction may translate screw in a second direction relative to the housing to move a first end (e.g., distal end) of the screw away from the opposing surface (e.g., second or first surface of channel) and/or the mounting member to release lighting device from the mounting member so that mounting member may be removed from channel 126. In some embodiments, as shown in FIG. 6, screw may include a head 136 (e.g., a slotted, hex, Phillips, torx, square, and the like drive styles) at the second end (e.g., proximal end) of fastener 112 that the user may engage to rotate screw in the first or second direction.

In some embodiments, fastener 112 may include a foot 132. Foot 132 may be positioned at the first end of fastener 112. Foot 132 may be moveably attached to a ball of a stem 114 (e.g., body) of fastener 112 to facilitate articulation of foot 132 in any direction, allowing foot 132 to substantially abut a surface of the mounting member disposed within channel 126. In various embodiments, foot 132 may include a rubber pad. For example, foot 132 may include a smooth and/or textured rubber surface used to grip the mounting member. In some embodiments, foot 132 may be a circular foot. In other embodiments, foot 132 may include an elongated foot, where foot 132 may extend along a width of channel 126. The elongated foot may be attached to any number of stems. For instance, the elongated foot may be attached to one stem positioned in the center of foot. In another instance, the foot may be attached to two independently or dependently operating stems at opposing ends of the same foot. For example, a single stem may extend from first surface 142 or second surface 144 and have an elongated pad attached thereto configured to bias mounting member to secure the mounting member within channel 126. In other embodiments, a plurality of stems may extend from first surface 142 or second surface 144 and have an elongated pad attached thereto that is configured to bias mounting member when secured within channel 126. Thus, though fasteners 112 are shown as a pair of fasteners, other embodiments are contemplated. Lighting device 100 may include any number of fasteners (e.g., a single fastener or a plurality of fasteners) to secure mounting member within channel 126 extending from either surface defining channel 126.

As shown in FIG. 2, in one or more embodiments, second surface 144 of housing 106 may include an opposing pad 116 (e.g., an elongated pad) configured to contact (e.g., contact an opposing surface of mounting member from fasteners 112) mounting member 101. In some embodiments, opposing pad 116 may be adjustable relative to housing 106. In other embodiments, opposing pad 116 may be fixed relative to housing 106. Opposing pad 116 may be composed of an elastic material that may conform to the shape of the abutting mounting member surface. As understood by one of ordinary skill in the art, opposing pad 116 may be any shape and/or size.

Figure 6:
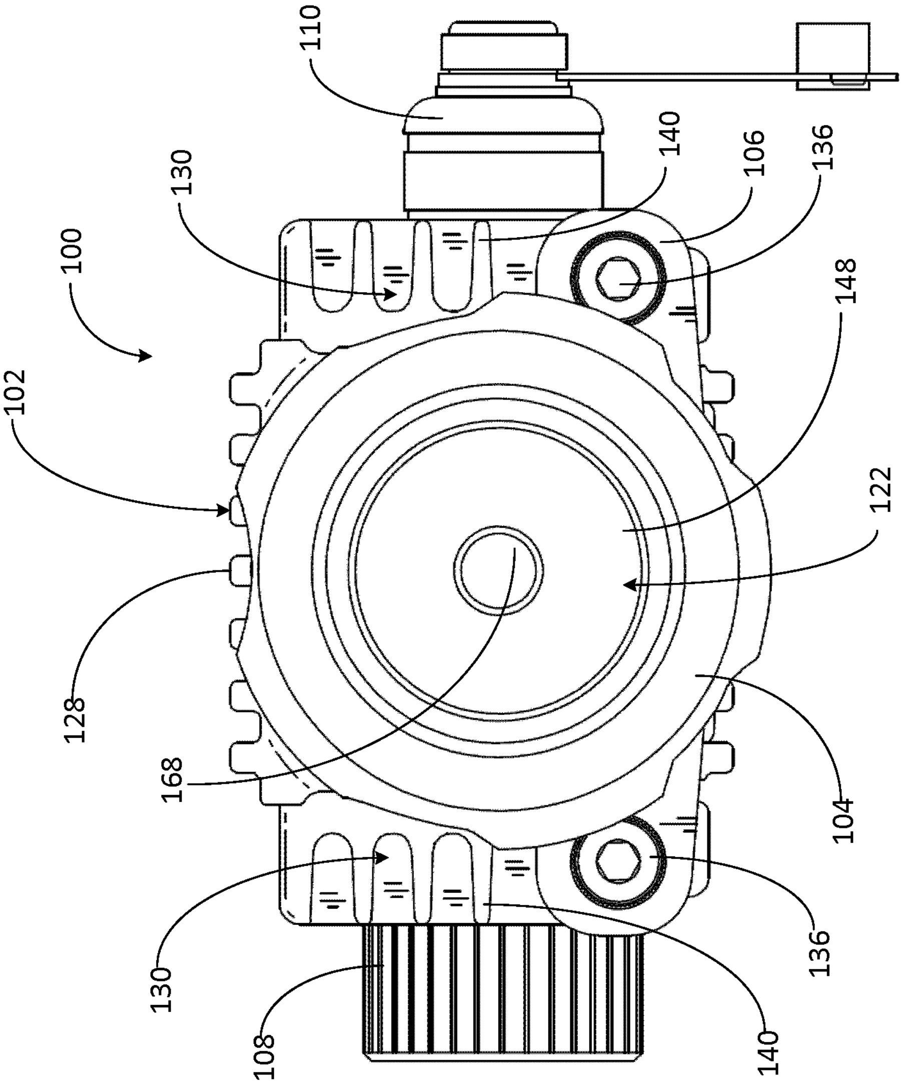
Figure 7:
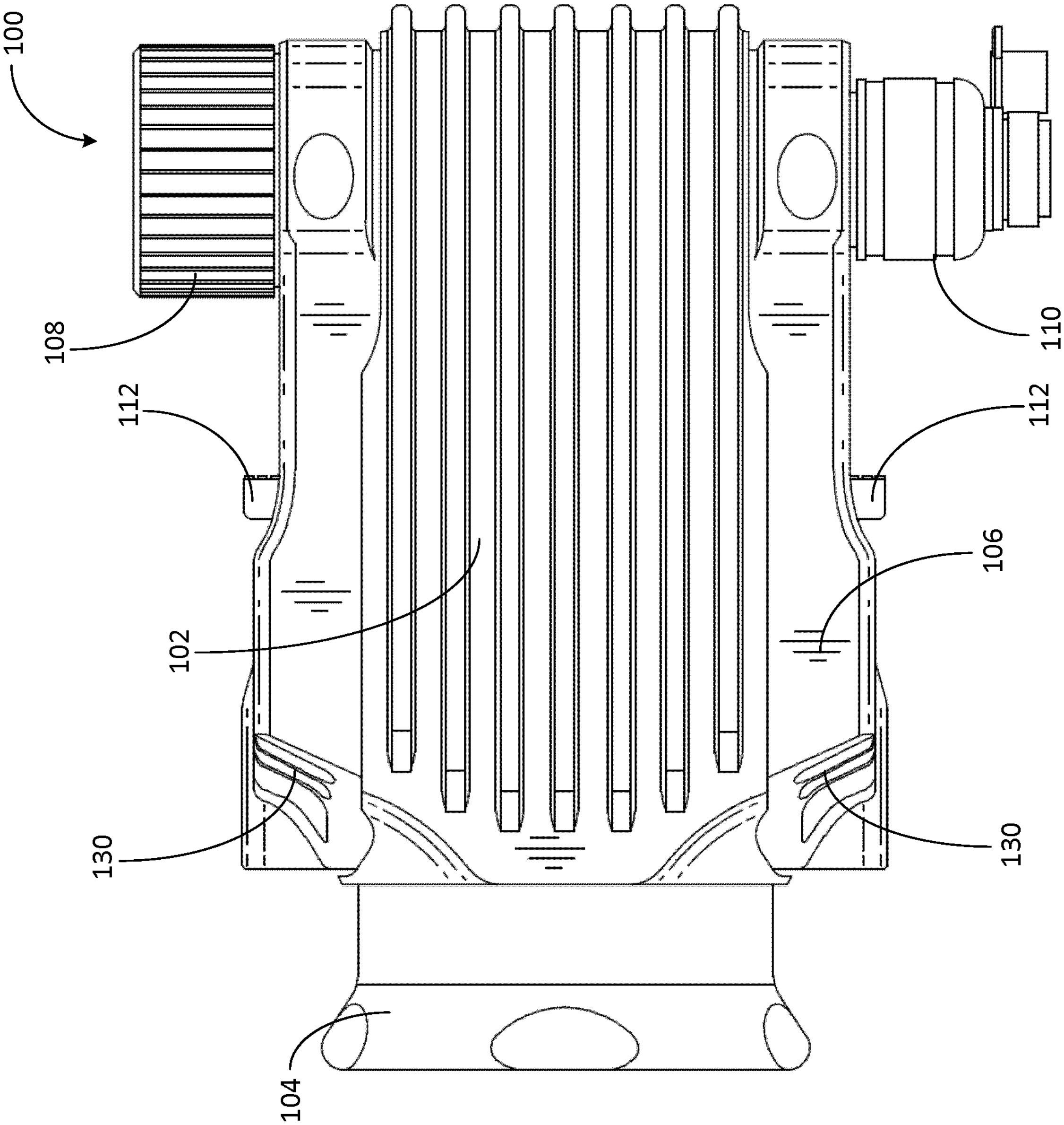
Figure 8:
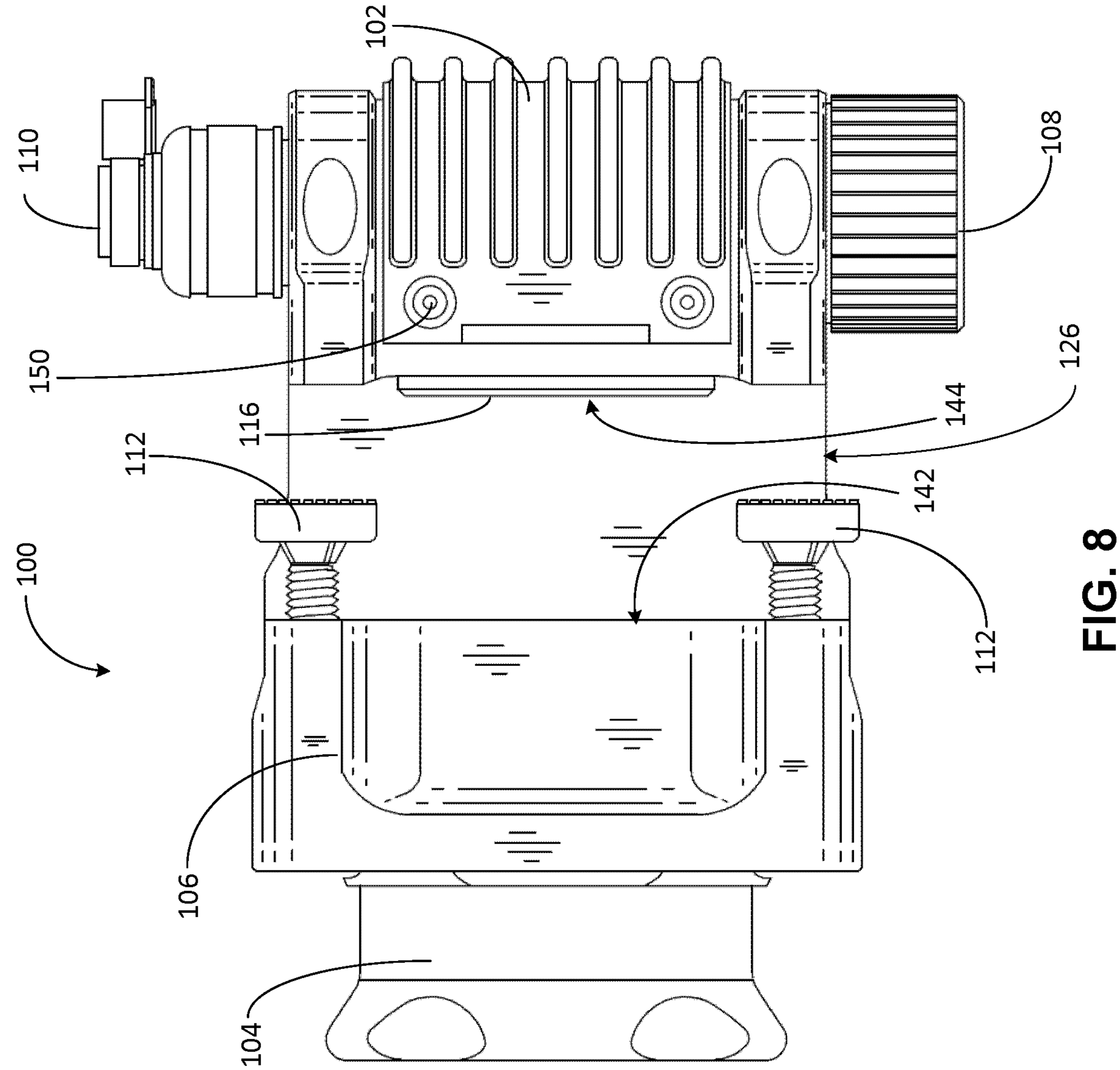

As shown in FIG. 6, in one or more embodiments, lighting device 100 may include optical assembly 122, which is secured to housing 106. For instance, optical assembly 122 may be secured to a first end 152 of housing 106. Lighting device 100 may include optical assembly 122, which may include one or more light sources (e.g., light source 168. One or more light sources may be disposed within housing 106 and configured to project light (e.g., a beam of visible light, infrared light, ultraviolet light, and/or laser light of various wavelengths) from lighting device 100 (e.g., in the direction in which equipment is directed). Optical assembly 122 may include one or more optical elements, such as one or more lenses and/or one or more reflectors (e.g., one or more substantially parabolic reflectors and/or one or more reflectors of any other desired shape). One or more reflectors may include reflector 148. In various embodiments, reflector 148 may include, for example, a parabolic reflector. Optical assembly 122 may be used in conjunction with at least one light source to provide lighting by lighting device 100 (e.g., to project light generated by the light source from housing 106 onto an external scene, or environment, such as a scene of interest to the user of lighting device 100). Although lighting device 100 is primarily described herein as having a reflector, other embodiments are contemplated. For example, in various embodiments, one or more lenses may be provided to guide light from a light source within housing 106 onto the external scene. Optical assembly 122 and one or more associated light sources may be configured to project light of various different wavelengths from lighting device 100.

As previously mentioned herein, light source 168 may include other light sources or groups of light sources. For example, in one embodiment, light source 168 may include one or more red light sources, green light sources, and/or blue light sources. Light source 168 may include any desired number of groups of light sources and each group of light sources may include any desired number and/or combination of light sources. Accordingly, discussion herein of white light sources and infrared light sources is by way of example only, and not by way of limitation.

One or more lenses (e.g., one or more substantially flat lenses and/or one or more lenses of any other desired shape) and a plurality of light sources may be provided in front portion 106*a* (e.g., faceplate of housing 106) to permit different wavelengths of light to be provided by lighting device 100. In various embodiments, optical assembly 122 may include one or more reflectors (e.g., one or more substantially parabolic reflectors and/or one or more reflectors of any other desired shape), lenses, and the like.

In one or more embodiments, optical assembly 122 may include a total internal reflection (TIR) lens, which may be generally conical in configuration. In some embodiments, TIR lens may have a top end (e.g., a larger end) that is proximate a planar lens or window (e.g., lens 120, as shown in FIG. 2) and may have a bottom end (e.g., a smaller end) that is proximate light source 168. In some embodiments, top end and bottom end of TIR lens may be eccentric with respect to a centerline of optical assembly 122. TIR lens, and more particularly bottom end thereof, may be made to be eccentric or offset with respect to centerline of optical assembly 122 by forming a bore of bezel to be eccentric with respect to centerline. Thus, if bezel is rotated with respect to optical assembly 122, TIR lens moves in an arc.

As understood by one of ordinary skill in the art, different types of lenses other than TIR lens may be used. Thus, discussion herein regarding the use of a TIR lens is by way of example only and not by way of limitation. Any desired type of lens and/or reflector may be used. Any desired combination of types of lenses and/or reflectors may be used. For example, one or more lenses (e.g., one or more substantially flat lenses and/or one or more lenses of any other desired shape) and/or one or more reflectors (e.g., one or more substantially parabolic reflectors and/or one or more reflectors of any other desired shape) may be used.

In various embodiments, lighting device 100 may include user controls. In some embodiments, user controls may include, for example, a tape switch assembly (e.g., tape switch assembly 200 of FIGS. 10-18), as discussed further below in this disclosure. In other embodiments, user controls may include a tail cap 110. Tail cap 110 may be disposed on a side of housing 106. For example, in non-limiting embodiments, tail cap 110 may be disposed on a side of rear portion 106*c* of housing 106. In various embodiments, user controls may include an actuator (e.g., a dome switch button, a slider, a knob, and so on), as discussed further below in FIGS. 27 and 28. User controls, such as switch assembly or actuator, may be provided on multiple sides of lighting device 100 for ambidextrous use by a user.

In various embodiments, tail cap 110 may include a jack cover 138 for closing tail cap's rear opening when a plug is removed from a jack 182 of tail cap 110, which are discussed further in this disclosure below. Jack cover 138 may be fabricated (such as by molding) of a plastic material so that, in some embodiments, a flexible band with a ring at one end secured to jack 182 and encircling the opening, and with a solid plug or cap at the flexible band's free end configured for friction-fit insertion into the opening.

Figure 9:
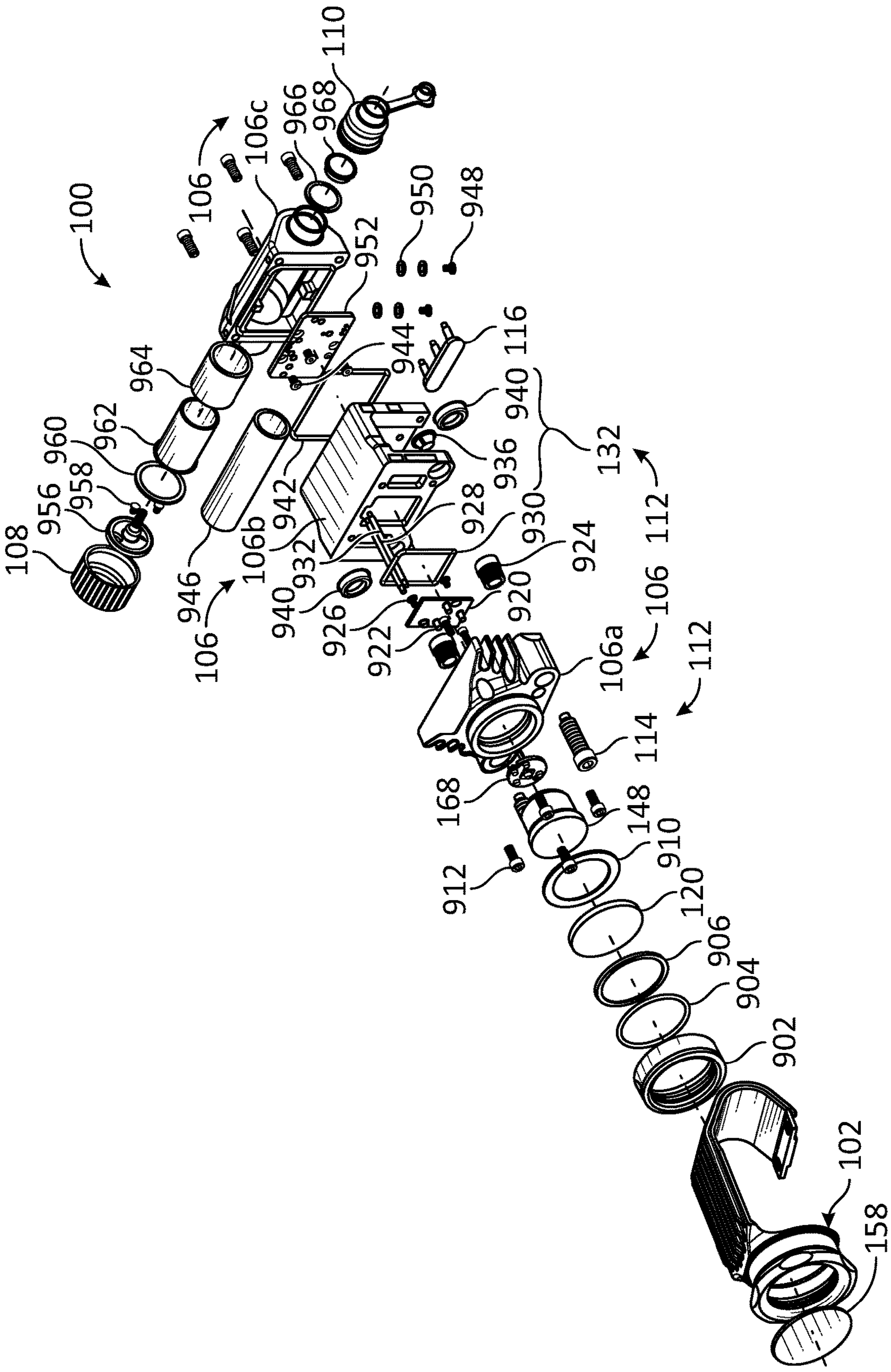
FIG. 9 illustrates an exploded perspective view of the lighting device in accordance with an embodiment of the present disclosure.

Referring to FIG. 2, in various embodiments, lighting device 100 may include a power source, as discussed further in FIG. 9. Power source may be at least partially disposed within housing 106. For instance, power source may be disposed within rear portion 106*c*. Housing 106 may include a cavity that power source may be enclosed within. In various embodiments, cavity may be covered by a battery cap 108. In some embodiments, battery cap 108 may thread onto a portion of housing 106 to seal power source within the cavity of housing 106.

Now referring to FIG. 9, an exploded view of lighting device 100 is shown in accordance with an embodiment of the present disclosure. As shown in FIG. 9, lighting device 100 may include a sacrificial lens 158, cover 102, optical assembly 122, which may include bezel 902, o-ring 904, lens gasket 906, lens 120 (e.g., 1.477 diameter window), spacer 910, reflector 148, and light source 168, front portion 106*a* (e.g., heat sink), insert 924, light source printed board circuit (PCB) 920 (e.g., light source contact board), PCB screws 922 (e.g., socket head cap screws (SHCS), screws 926, screws 912 (e.g., screws for attaching front portion 106*a* to center portion 106*b*), stem 114 of fastener 112, foot 132 of fastener 112, grip pad 940 of foot 132, socket 936 of foot 132, socket 936 of foot 132, grip pad 940 of foot 132, center o-ring 930, center portion 106*b*, rear portion 106*c* (e.g., battery housing), control printed board circuit (PCB) 952, rear o-ring 942, screws 944 (e.g., flat-head cap screws (FHCS), o-ring 966, contact bushing 968, tail cap 110, battery insulator 964, battery contact sleeve 962, battery cavity o-ring 960, battery cap contact 956 (e.g., contact having an PCB assembly), screws 958, battery cap 108, wires 928 and 932, washer 950, screws 948, power source 946 (e.g., one or more batteries).

In one or more embodiments, lighting device 100 may include interchangeable tail cap 110, as previously discussed herein. Tail cap 110 may be selectively attached to rear portion 106*c* of housing 106. In some embodiments, tail cap 110 may be selectively attached to housing 106 using internal threads of tail cap 110. In some embodiments, when tail cap 110 is secured to battery housing 106 (e.g., rear portion 106*c*), a spring contact included in tail cap 110 may conductively engage a rear terminal of power source 946. Battery spring contact may be conductively secured to a normally open circuit connector device or jack 182 (shown in FIG. 3) to which a switch device, such as a switch assembly 200 of FIGS. 10-21 may be connected for selectively closing the circuit. Jack 182 may be retained by tail cap 110 and may include a rear opening for receiving and detachably retaining a complementary connector (e.g., plug 212 of switch 216).

In various embodiments, lighting device 100 may include a planar lens and/or a total internal reflection (TIR) lens, which may be secured within a TIR housing. In one or more embodiments, planar lens may be a substantially flat (e.g., plano-plano) lens. It is contemplated that planar lens may be implemented in accordance with any desired type of lens in other embodiments. In one embodiment, TIR lens may be implemented as a solid optical element that uses total internal reflection to direct light from a selected light source (e.g., an LED or other light source) to planar lens. Planar lens and TIR lens may be formed of glass, plastic, or any other desired material that is substantially transparent at the wavelengths of light produced by the light sources. Indeed, any desired combination of material and types of lenses may be used.

Light source PCB 920 (e.g., FR-4 PCB) may be attached to housing 106 (e.g., front portion 106*a* or heat sink 130) using screws 926. Light source 168 may be attached to metal core board and may include one or more light sources (e.g., LEDs and/or other types of light sources) attached thereto. In one embodiment, such LEDs may be implemented using one or more dies (e.g., multiple die LEDs). In one embodiment, one or more white light LEDs and one or more infrared LEDs may be attached to the metal core board and/or communicatively connect to light source PCB 920. Heat sink 130 may operate as a heat sink for the one or more light sources (e.g., light source 168) that are attached to front portion 106*a*. Thus, heat sink 130 may dissipate heat from the one or more light sources to other parts of lighting device 100 and/or to ambient air.

A control PCB 952 may be attached to housing 106. For instance, and without limitation, control PCB 952 may be attached to rear portion 106*c* of housing 106 using screws 944 to allow for easy interchangeability of center portion 106*b*. In one embodiment, control PCB 944 may be implemented using two stacked PCBs. Light source PCB 920 and/or control PCB 944 may be electrically connected to one or more batteries used to implement power source 946 provided within a cavity defined by rear portion 106*c* of housing 106. Control PCB 952 may include circuitry to determine which, if any, of the one or more light sources are to be illuminated, and also to illuminate the selected light source. Thus, control PCB 952 may receive electric power from one or more batteries used to implement power source 946 and provide electric power to the selected light source. One or more additional electrical connections may be implemented using appropriate springs, wires, or other techniques which will be appreciated by those skilled in the art. For example, wires 928 and 932 may be used to provide a communicative connection between one or more components of lighting device, such as any PCBs, light sources, and/or the like. In some embodiments, wires 928 and 932 may extend from rear portion 106*c*, traverse through center portion 106*b*, and extend to front portion 106*a*.

In one embodiment, the structural components of lighting device 100 may be formed of a metal, such as aluminum, magnesium, or steel. In another embodiment, these structural components may be formed of a durable plastic, such a polycarbonate or acrylonitrile butadiene styrene (ABS), or any other material as desired.

Now referring to FIGS. 10-17, various views of a tape switch assembly 200 is shown in accordance with several embodiments of the present disclosure. In various embodiments, tape switch assembly 200 (also referred to herein as a "switch assembly" may include a switch device 216 (also referred to herein as a "switch") configured to selectively adjust a mode of operation of light source 168 of lighting device 100, a casing 202 configured to receive switch 216 therein, a pin 220, an actuator 204 having a slot 222 configured to receive pin 220 to connect actuator 204 to casing 202, where actuator 204 may receive a depression from a user and translate relative to pin 220 in response to the depression to actuate switch 216, and, thus, lighting device 100.

In some embodiments, switch device 216 may include a flexible cable 210 that includes a first end attached to a body (e.g., flexible enclosure 230) of switch 216 and a second end attached to a plug 212, where cable 210 may include two conductors connecting the electrodes of switch 216 to two conductive contacts of plug 212. In some embodiments, one of the plug contacts is provided by the outer substantially cylindrical longitudinal conductive sheath which, when inserted through the opening of jack 182 of tail cap 110, completes a conductive path to one electrode terminal of the light emitter (e.g., light source 168). For example, the outer plug contact engages a jack spring contact of jack 182, which is conductively coupled to the conductive battery housing of rear portion 106*c*. The other plug contact may be provided by an inner longitudinal conductive sheath in contact engagement with a longitudinal conductive pin of jack 182, which pin contact may be conductively secured to the battery spring contact, which in turn is in contact engagement with the rear terminal of power source 946. Since the other terminal of power source 946 is conductively connected to the other terminal of the light emitter, switch 216 may be in circuit with the battery 946 for energizing the light emitter upon actuation of switch 216 while plug 212 is connectively inserted jack 182. In some embodiments, jack cover 138 may include one or more radial projections or appendages about jack cover 138, which may be used by the user for removing jack cover 138 from the rear opening of tail cap 110.

As previously discussed herein, tail cap 110 may include a jack cover 138 for closing the tail cap's rear opening when plug 212 of switch device 216 is removed from jack 182. Jack cover 138 may be fabricated (such as by molding) of a plastic material such that a flexible band with a ring at one end secured to jack 182 and encircling the opening, and with a solid plug or cap at the flexible band's free end configured for friction-fit insertion into the rear opening.

In one or more embodiments, lighting device 100 may include switch assembly 200. In an embodiment, switch assembly 200 may be positioned, for convenient access, by the user of lighting device 100 to aid the user in controlling light generated by lighting device 100 while the user also operates the equipment. Switch assembly 200 may be located remotely relative to lighting device 100 to permit the user to conveniently operate lighting device 100 while lighting device 100 is mounted on the equipment and the user is handling the equipment. For instance, the user may operate lighting device 100 when lighting device 100 is mounted on a ballistic shield using switch assembly 200 without the user having to reach outside of a region guarded by the ballistic shield. The user may conveniently actuate switch assembly (e.g., by way of the user's thumb or finger) while holding the grip of the shield to turn on, turn off, increase or decrease the brightness of the light, change the light source, and so on, of the lighting device 100. Switch 216 may provide one or more actuators. For instance, in some embodiments. Actuator may include a first actuator for a momentary-on switch and second actuator for switch 216 may be a constant-on switch.

Lighting device 100 and switch assembly 200 may be communicatively connected so that information and/or data may be exchanged between lighting device 100 and switch assembly through wired and/or wireless communication to operate lighting device 100 using switch assembly 200 or provide feedback to switch assembly 200. In some embodiments, lighting device 100 and switch assembly 200 may be communicatively connected using a wired connection, such as a cable 210, which may specifically provide electrical communication between lighting device 100 and switch assembly 200. Switch assembly 200 may include plug 212, which may be received by jack 182 of lighting device 100. Cable 210 may conductively connect plug contacts of plug 212 to tape switch electrodes situated within switch 216.

In other embodiments, lighting device 100 and switch assembly 200 may be communicatively connected using a wireless connection facilitated by a communication component. In some embodiments, communication component may be implemented as a connector that, for example, interfaces one or more electronic components to an external device, a network interface component (NIC) configured for communication with a network and other devices in the network, and/or other implementations. In various embodiments, communication component may include one or more wired or wireless communication components, such as a wireless local area network (WLAN) component based on the IEEE 802.11 standards, wireless broadband component, an Ethernet connection, Bluetooth connection, mobile cellular component, a wireless satellite component, or various other types of wireless communication components. Other wireless components (e.g., radio frequency (RF), microwave frequency (MWF), and/or infrared frequency (IRF) components) may be configured to communicate with a network, a modem, a LAN card, and any combination thereof. For instance, communication component may include an antenna used for wireless communication purposes. In other embodiments, the communication component may be configured to interface with an Ethernet device, DSL (e.g., Digital Subscriber Line) modem, a PSTN (Public Switched Telephone Network) modem, and/or various other types of wired and/or wireless network communication devices configured for communication with a network.

Figure 21A:
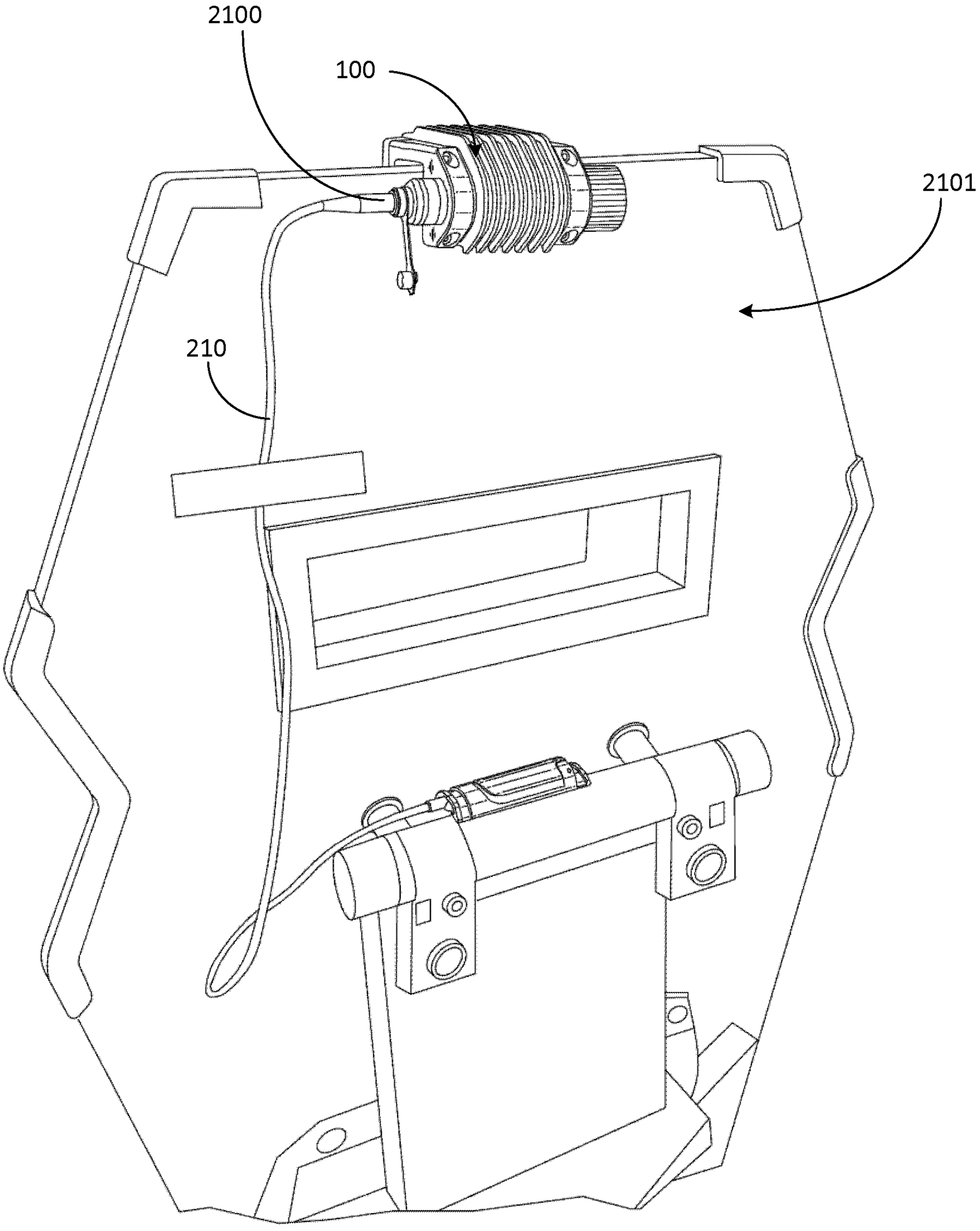
FIGS. 21A and 21B illustrate various perspective views of a lighting device and switch assembly attached to a piece of equipment in accordance with an embodiment of the present disclosure.

In one or more embodiments, casing 202 may include a casing 202 having a curved (e.g., arcuate) bottom surface 214 so that casing 202 may be secured to a complementary curved surface, such as at least a portion of a cylindrical grip of a ballistic shield (shown in FIG. 21A). In other embodiments, bottom surface 214 of switch assembly 200 may include a flat surface, or any other shape surface, that is complementary to the surface of the equipment switch assembly 200 is being removably attached to. In various embodiments, casing 202 may include a slot defined by bottom surface 214 of casing 202 to allow for easy insertion and removal of switch 216 from casing 202. Slot may also allow for a bottom surface of switch 216 to act as a portion of curved bottom surface 214 that attached to the equipment. In one or more embodiments, switch assembly 200 may include a securing component 208. Securing component 208 may include, for example, an adhesive layer configured to adhere switch assembly 200 to a surface of the equipment. In some embodiments, adhesive may be used to directly attached remote switch assembly 200 to the equipment. In other embodiments, adhesive may be used to adhere one or more strips of hooks and loops to switch assembly 200 so that switch assembly 200 may be removably attached to the equipment.

It may be appreciated that switch assembly 200 may be removably secured to any surface of the equipment, as shown in FIG. 21A, as may be convenient to the operator. For example, in the exemplary case of equipment including a ballistic shield, switch assembly 200 may be removably installed anywhere along a grip of the shield or a rear surface of the shield.

It may be appreciated that the detachable/attachable capability of the switch assembly 200 facilitates field replaceability of damaged tape switches and cables, as well as for connecting different types of remote switches. Further, switch devices may be provided with cables of different lengths, so that an operator may select a switch device with a cable of a particular length as may best suit a particular tactical situation.

Casing 202 may include tactile indicia, indicating the pressure actuable portion of switch device 216, such as raised transverse boundaries or bars longitudinally separated by the active or pressure sensitive length of the flexible enclosure (e.g., switch electrodes), for indicating to an operator the proper place to which pressure should be applied for operating the momentary switch.

In various embodiments, casing 202 may also be provided with transverse grooves 206 or other tactile indicia in the vicinity of the housing's front and rear ends, for facilitating the application of flexible ties (e.g., zip ties) to further secure tape switch assembly 200 to the ballistic shield or to another object if desired. For instance, casing 202 may include a pair of grooves 206 located at opposing ends of casing 202.

Figure 18:
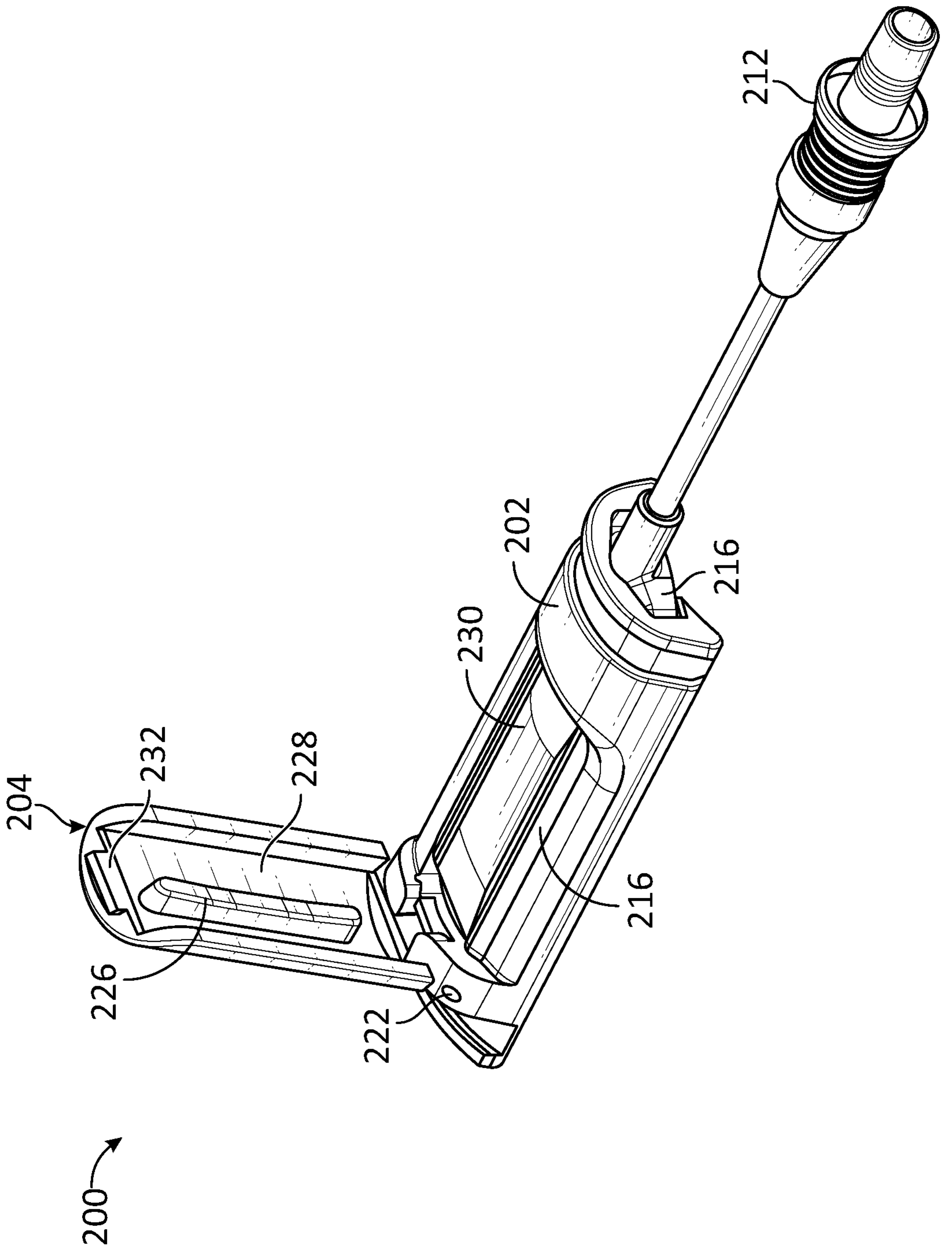
FIG. 18 illustrates a configuration of the switch assembly in accordance with an embodiment of the present disclosure.

Now referring to FIG. 18, a configuration of switch assembly 200 in accordance with an embodiment of the present disclosure is shown. In various embodiments, switch assembly 200 may include a remote switch assembly. In some embodiments, switch assembly 200 may include spaced electrodes in a flexible enclosure 230 (e.g., a button) to which pressure may be manually applied by an operator for squeezing the electrodes together thereby bringing them into electrical contact with each other. The electrodes may assume their spaced condition when the operator discontinues the application of such pressure.

In various embodiments, switch assembly 200 may include an actuator 204 configured to be depressed by a user so that a protrusion 226 of bottom surface 228 of actuator 204 may abut flexible enclosure 230 of switch 216 to operate lighting device 100, as discussed further below in FIG. 20. Casing 202 of switch assembly 200 may include an aperture that actuator may transverse therethrough to bias a top portion of flexible enclosure and operate lighting device 100.

Figure 19:
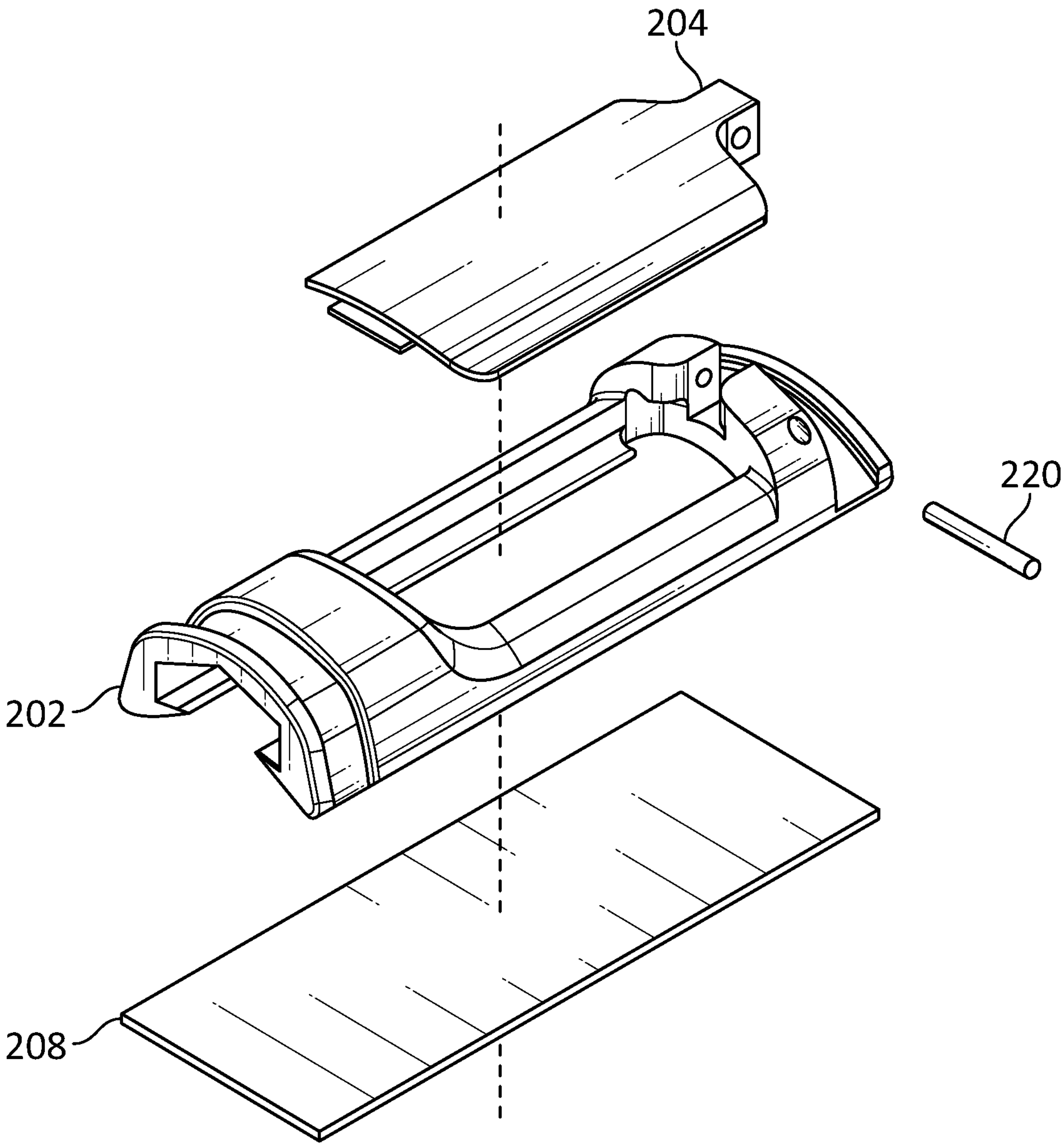
FIG. 19 illustrates an exploded perspective view of the switch assembly in accordance with an embodiment of the present disclosure.

Now referring to FIG. 19, an exploded perspective view of the switch assembly in accordance with an embodiment of the present disclosure is shown. As previously discussed herein, tape switch assembly may include actuator 204, casing 202, pin 220, and securing component 208. Switch 216 may be slidably disposed within casing 202 to attach switch 216 to a remote location on the equipment relative to lighting device 100. For instance, a user may slide switch 216 though an opening of a first end of casing 202 to at least partially dispose switch 216 within casing 202.

Figure 10:
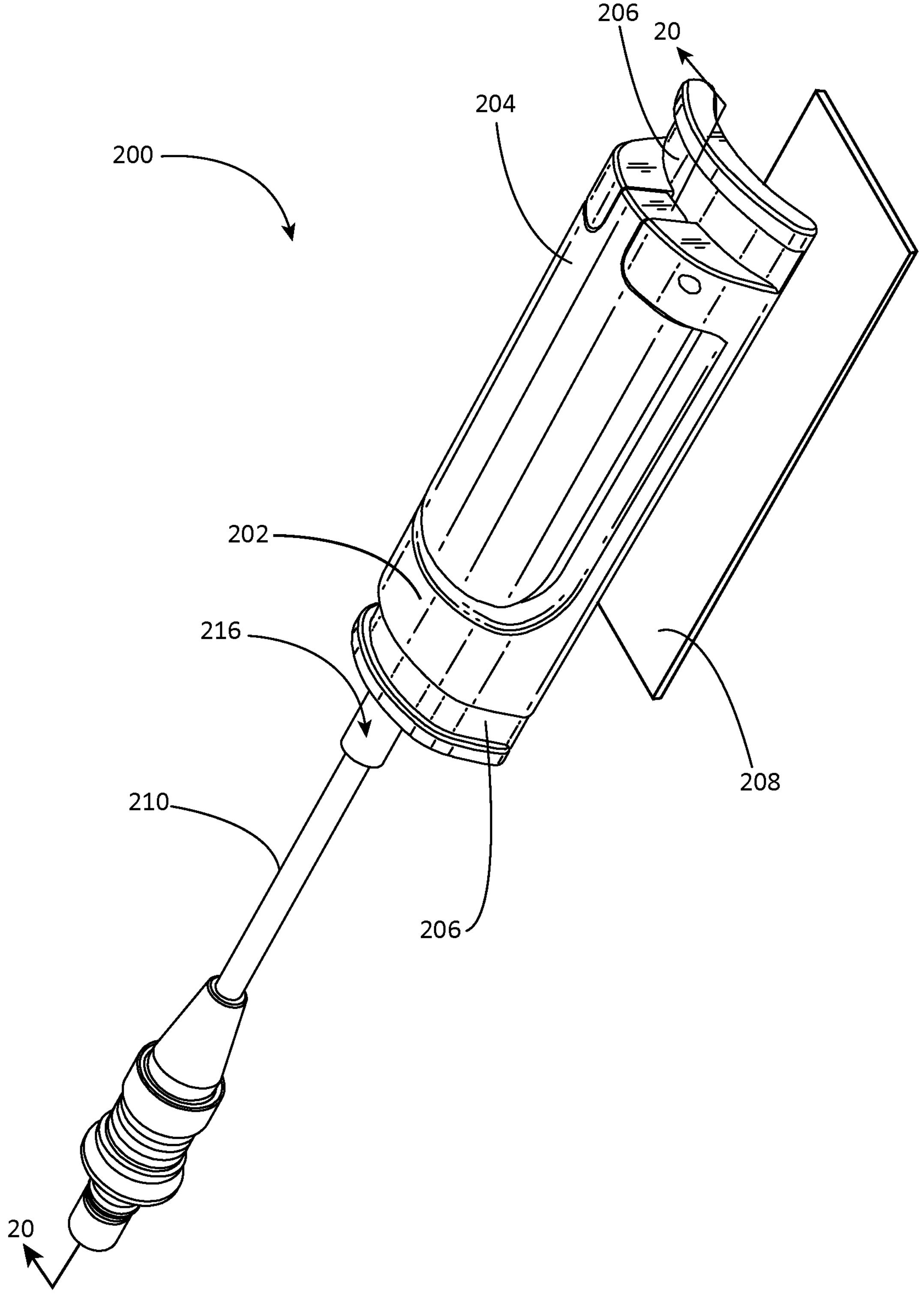
FIGS. 10-17 illustrate a switch assembly in accordance with several embodiments of the present disclosure.
Figure 11:
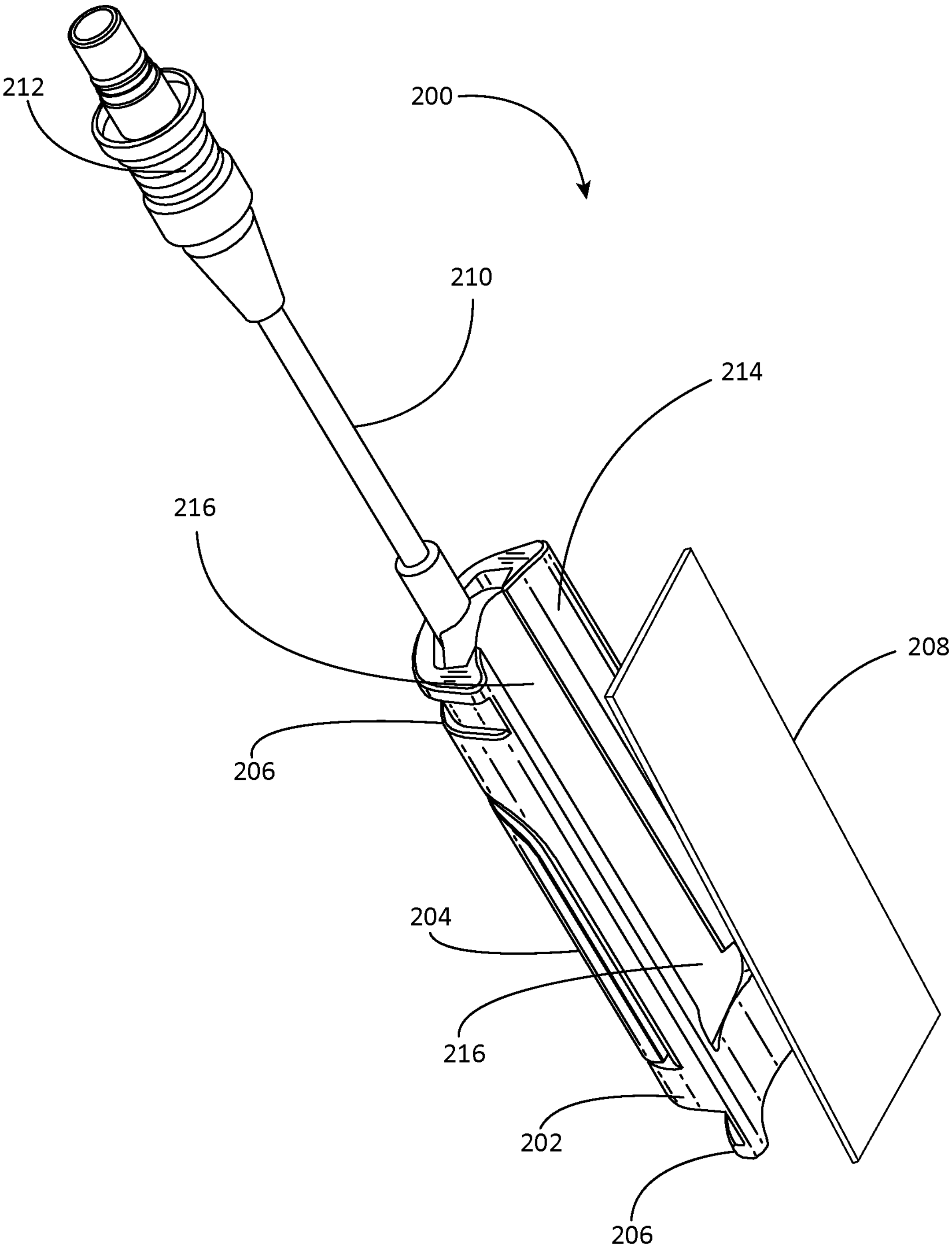
Figure 12:
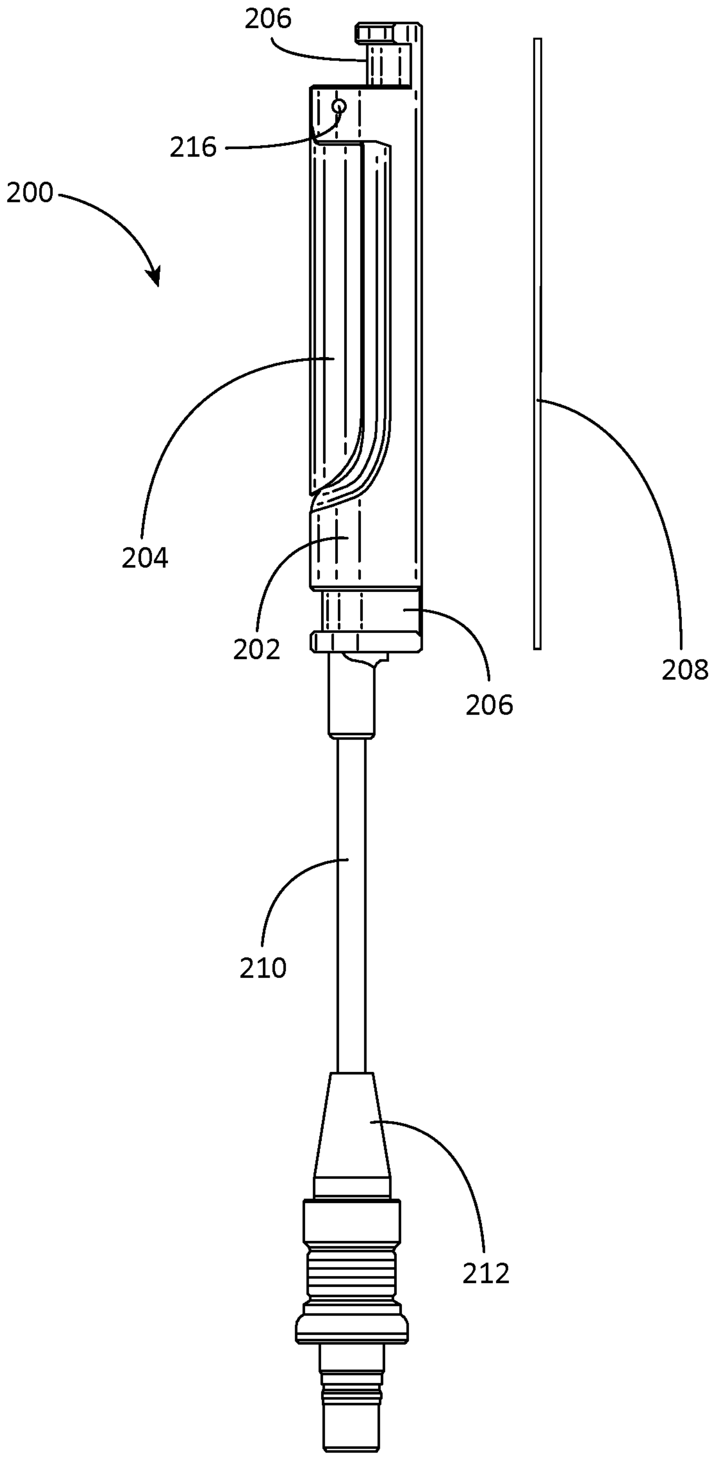
Figure 13:
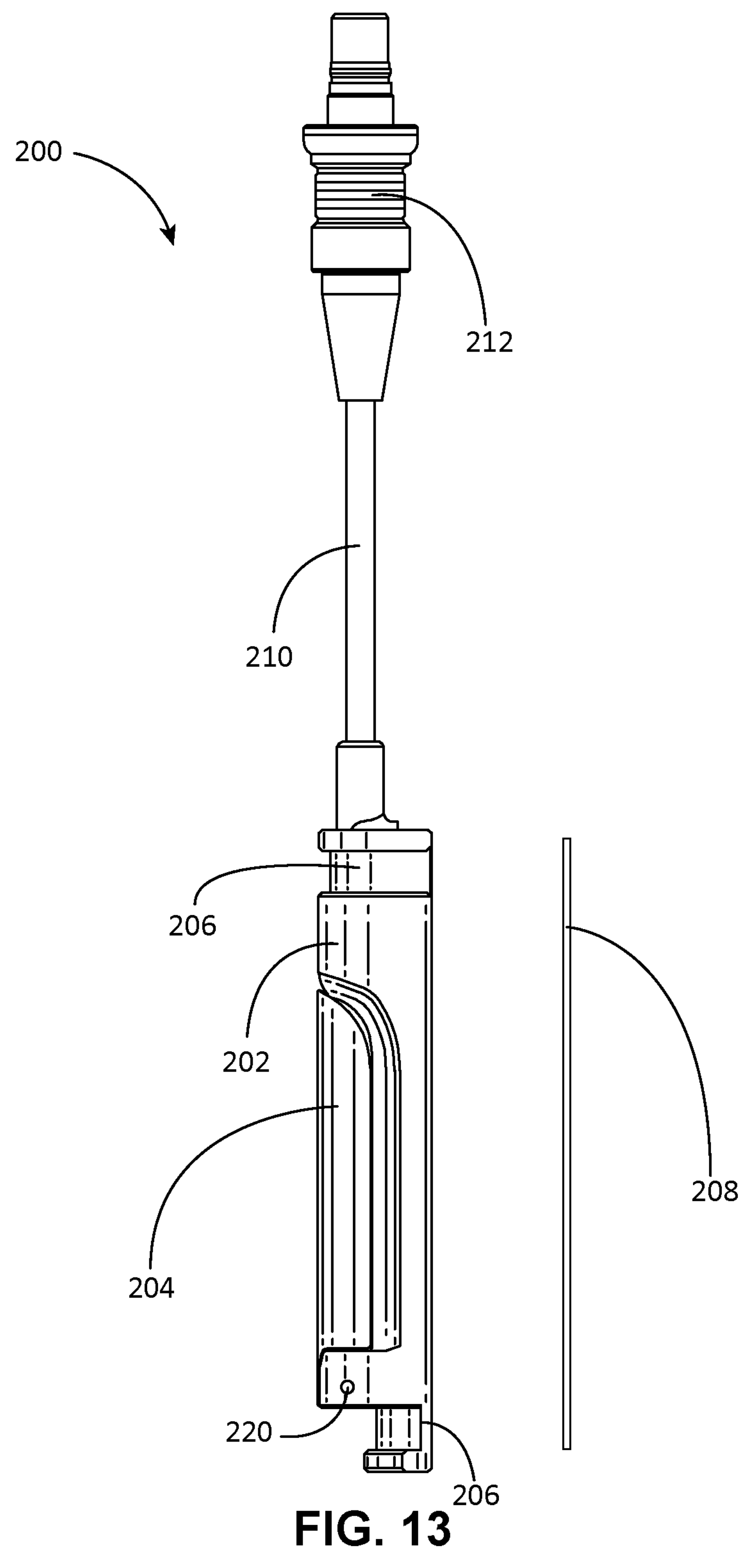
Figure 14:
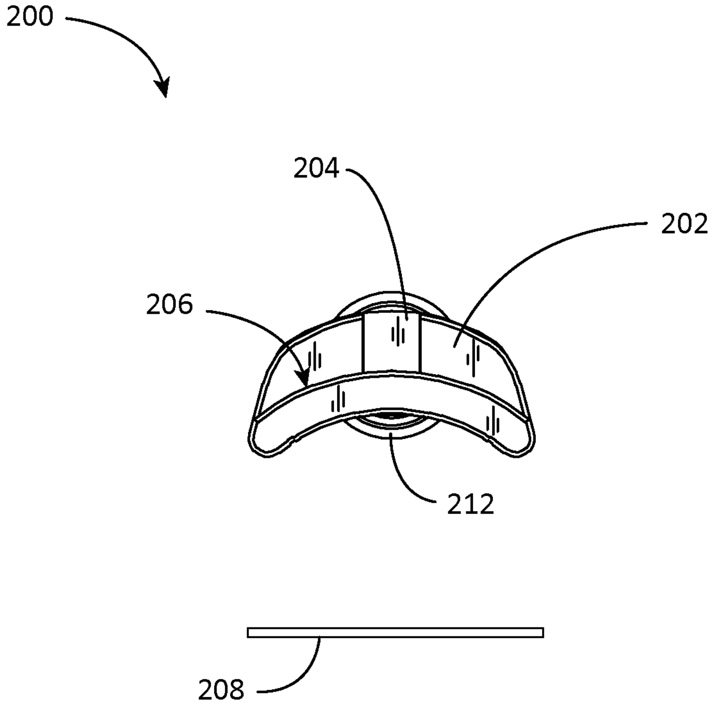
Figure 15:
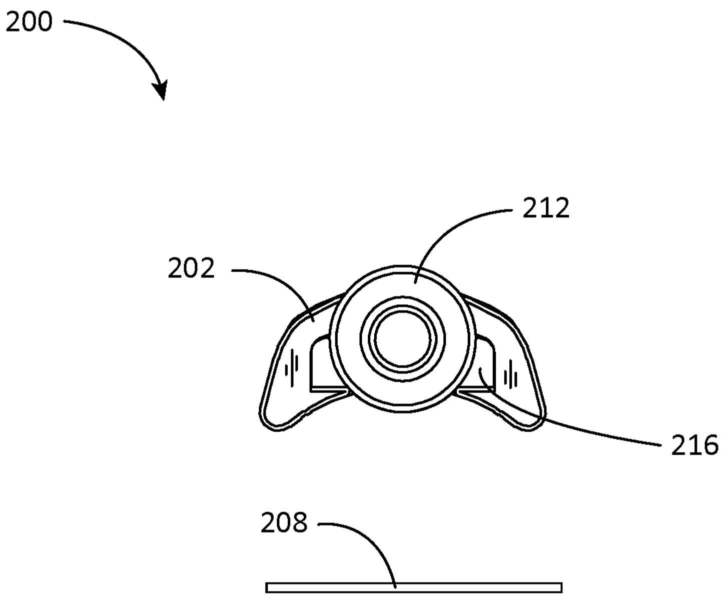
Figure 16:
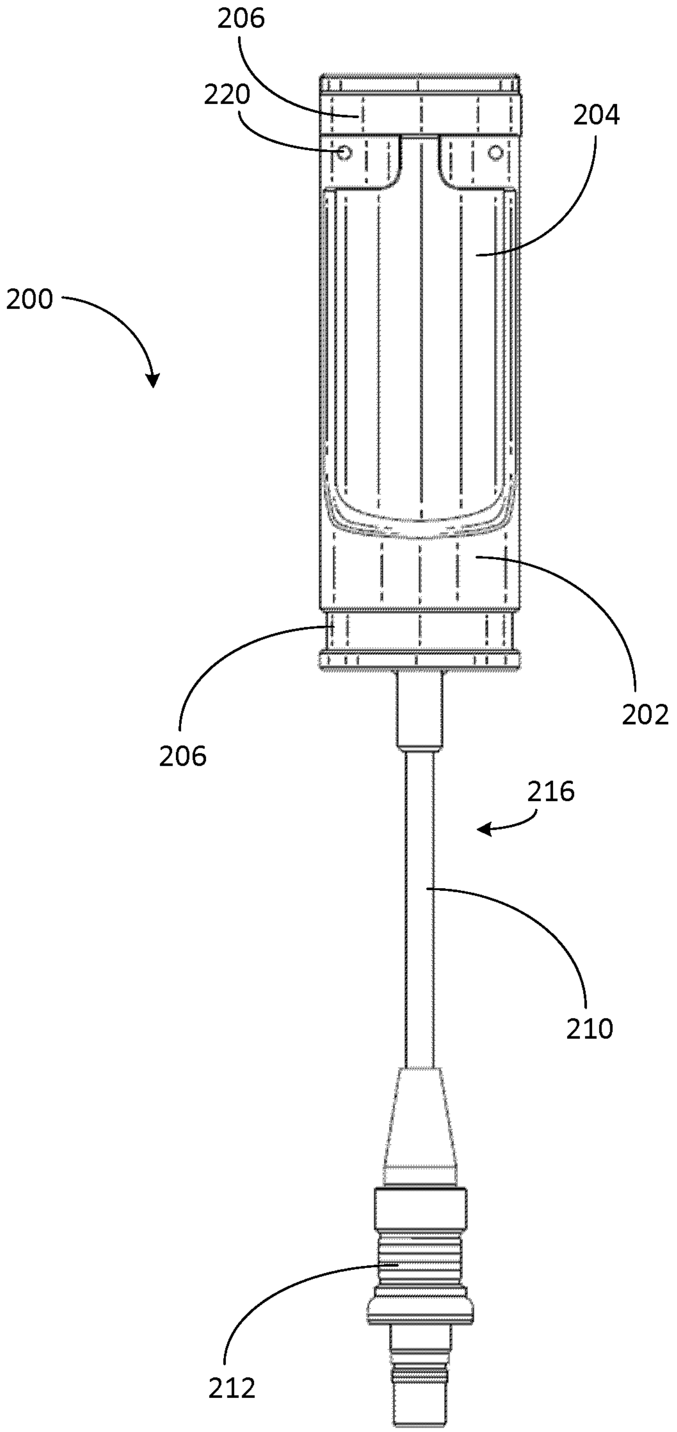
Figure 17:
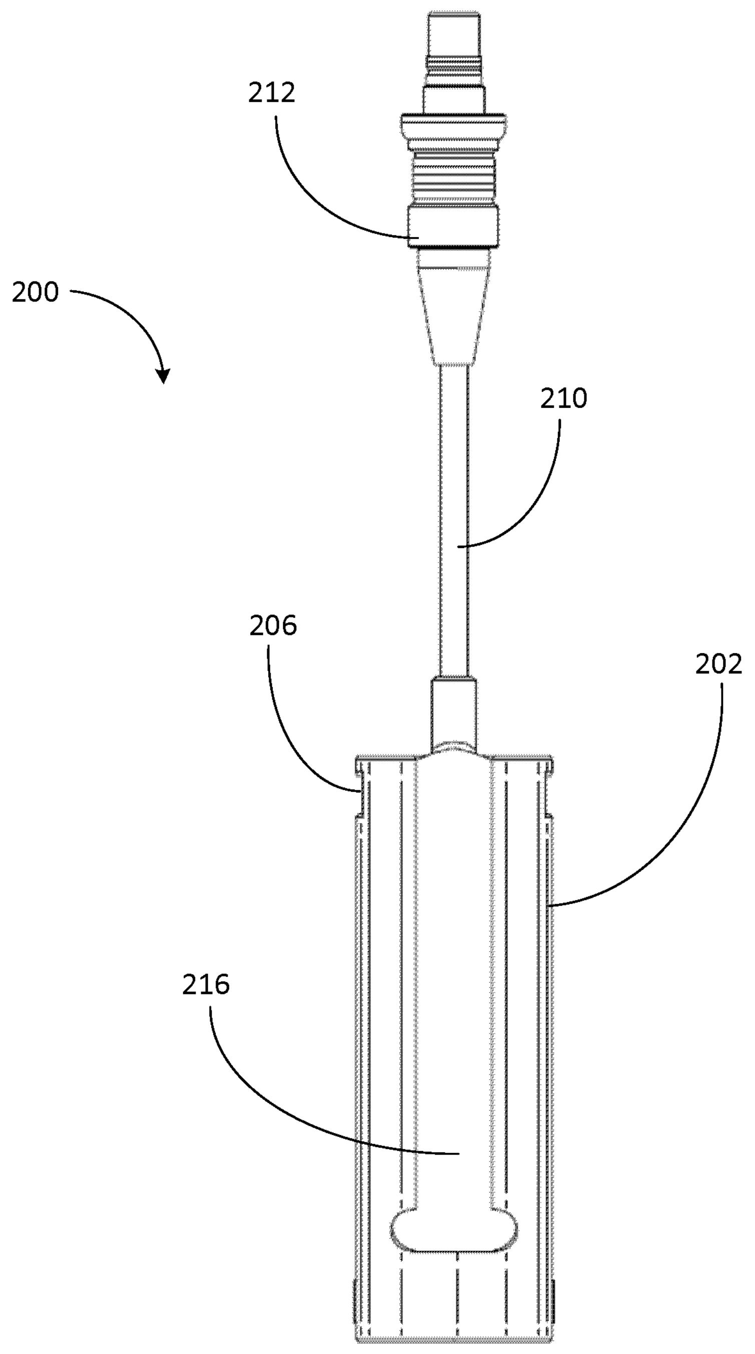
Figure 20:
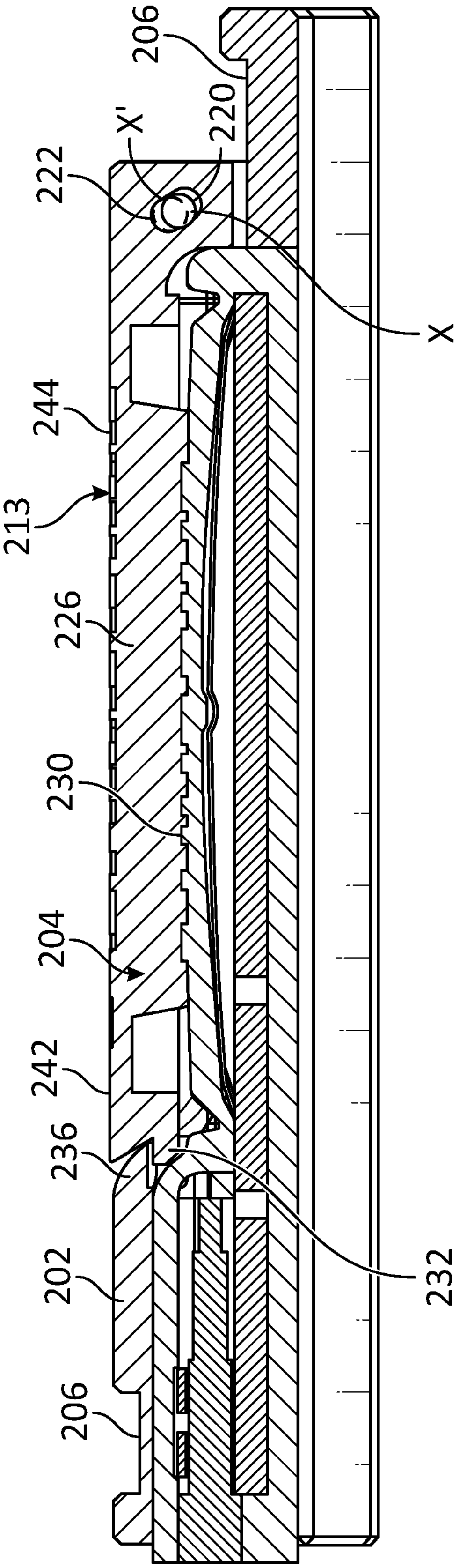
FIG. 20 illustrates is a left side cross-sectional view of the switch assembly of FIG. 10 as seen along the lines of the section 20-20 taken in FIG. 10 in accordance with an embodiment of the present disclosure.

Now referring to FIG. 20, a left side cross-sectional view of the switch assembly 200 of FIG. 10 as seen along the lines of the section 20-20 taken in FIG. 10 in accordance with an embodiment of the present disclosure is shown. As shown in FIG. 20, a user actuation may include the user depressing actuator 204 in direction 213. Slot 222 may be elongated to allow for actuator 204 to be depressed despite the location of the force applied on a top surface of actuator 204. For example, if the user depresses a first end 242 of actuator 204, actuator 204 may primarily pivot about pin 220 to move substantially along direction 213 to be activated. If the user depresses actuator 204 at a second end 244 of actuator, then actuator may translate downward and substantially parallel to direction 213. Thus, the area of interaction along the surface of actuator 204 is increased by pin 220 being disposed within slot 222 when elongated. When actuator 204 translates downward, actuator 204 may move relative to pin 220 such that pin 220 may be in a position x within elongated slot 222 when actuator 204 is not depressed and pin 220 may be in a position x' within elongated slot 222 when actuator 204 is depressed downward in direction 213. In various circumstances, the operator may need to quickly activate lighting device 100 and may need to do so under poor lighting conditions, actuator 204 covering a large portion of the top surface of switch 216 and actuator being able to be depressed despite the location of the force, allows for the user to easily activate lighting device 100 without requiring high precision or an unnecessary diversion of attention from the external environment.

In one or more embodiments, forces required to depress actuator 204 may be reduced by protrusion 226. Protrusion 226 may extend from bottom surface 228 of actuator 204. In some embodiments, protrusion 226 may extend centrally along bottom surface 228. When the user depresses actuator 204, then protrusion 226 may be biased against switch 216. Switch may be composed of an elastomeric material such that top portion of flexible enclosure 230 of switch 216 may depress when protrusion 226 biases against the top portion. In some embodiments, switch 216 may include squeezable-together tape switch electrodes enclosed within a body of switch 216.

In various embodiments, the body of switch 216 may be made from an elastomeric material, such as neoprene. The body of switch 216 and casing 202 may be fabricated using various techniques, such as by molding, three-dimensional printing, and the like.

In one or more embodiments, actuator 204 may be secured to casing 202 at first end 242 by a lip 232 abutting an engagement surface 236 of casing 202 and at second end 244 by pin 220 traversing though a pair of holes of casing 202 and slot 222 of actuator 204.

Figure 21B:
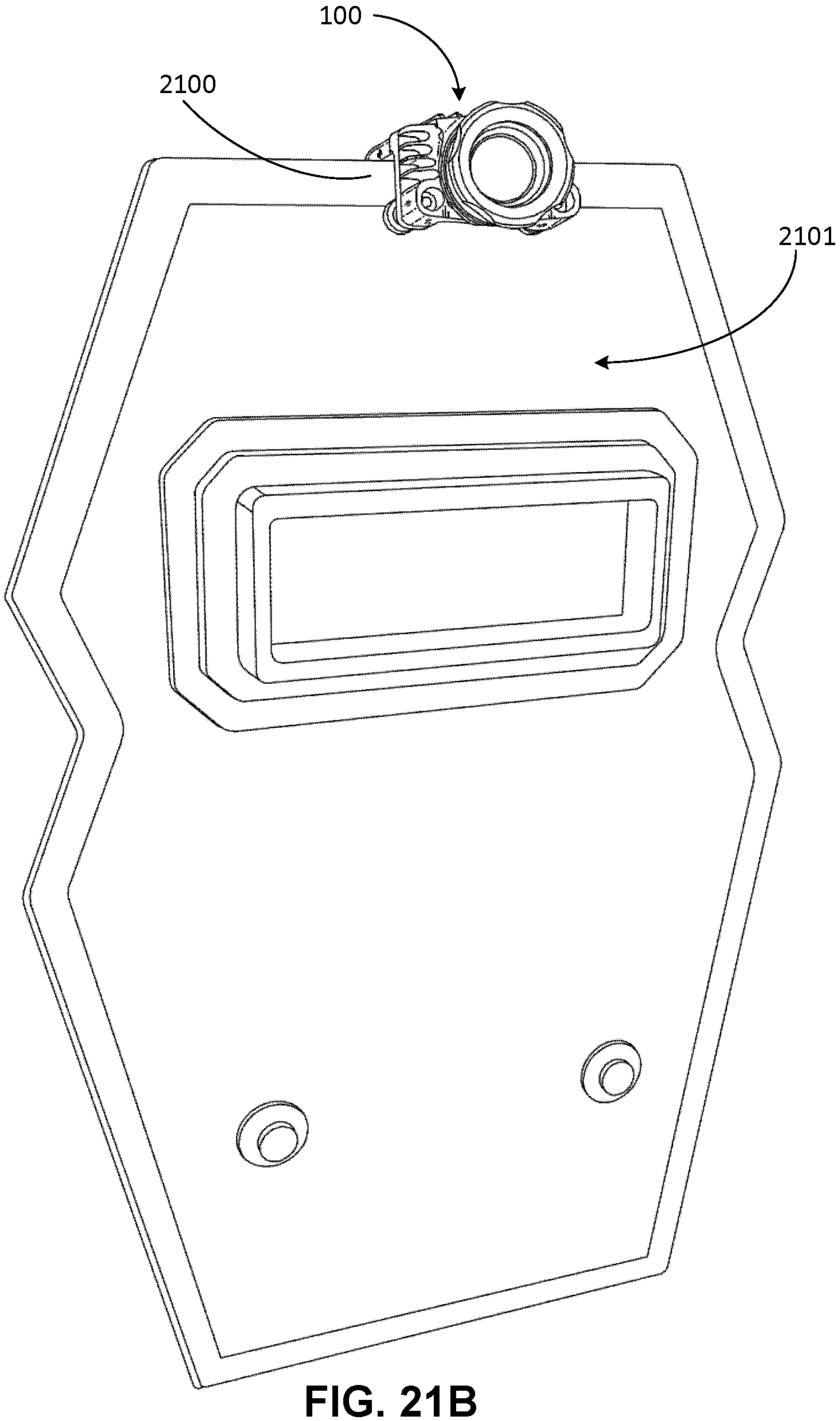
Figure 22:
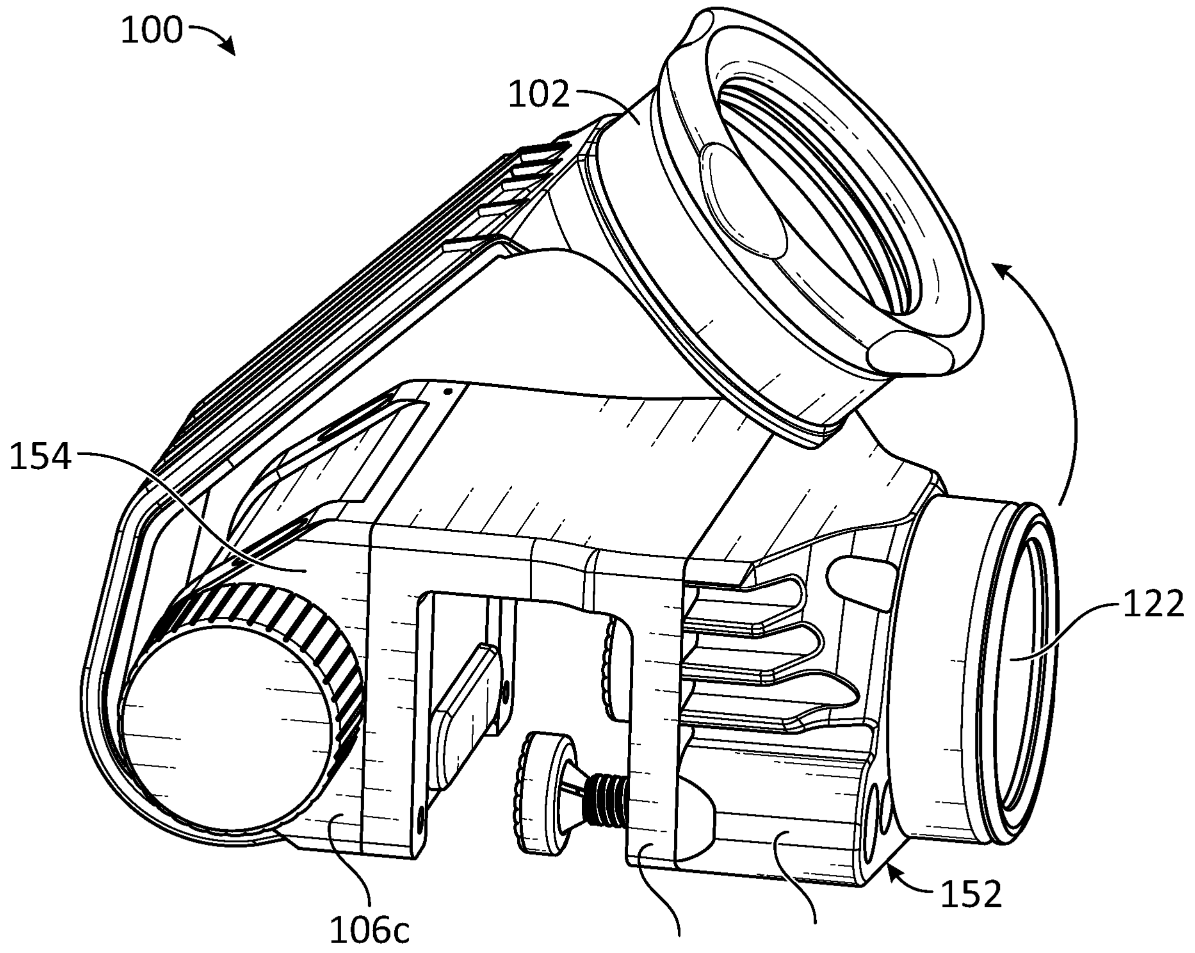
FIG. 22 illustrates a partial attachment of a cover to the lighting device in accordance with an embodiment of the present disclosure.
Figure 23:
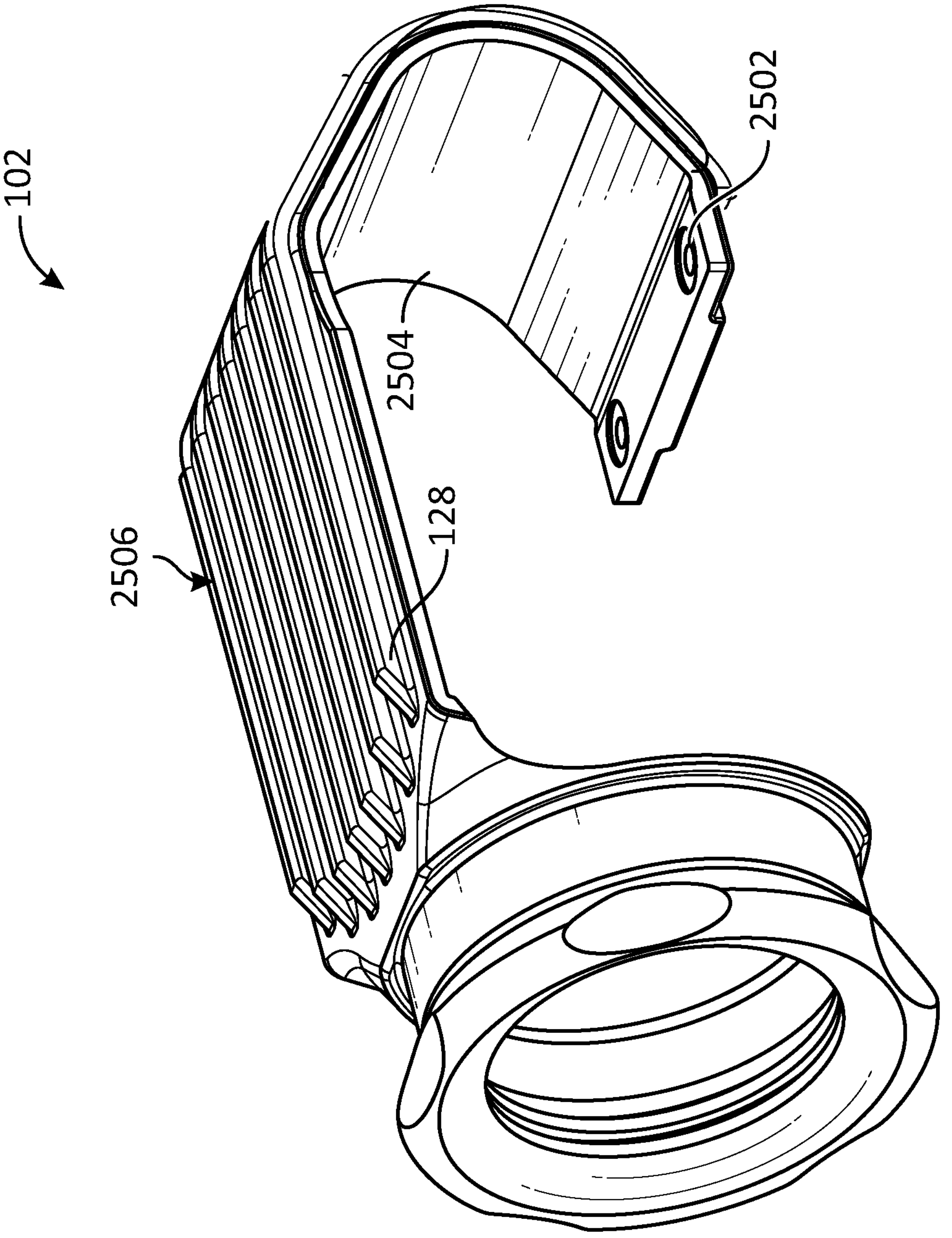
FIGS. 23-25 illustrate various views of the cover in accordance with several embodiments of the present disclosure.
Figure 24:
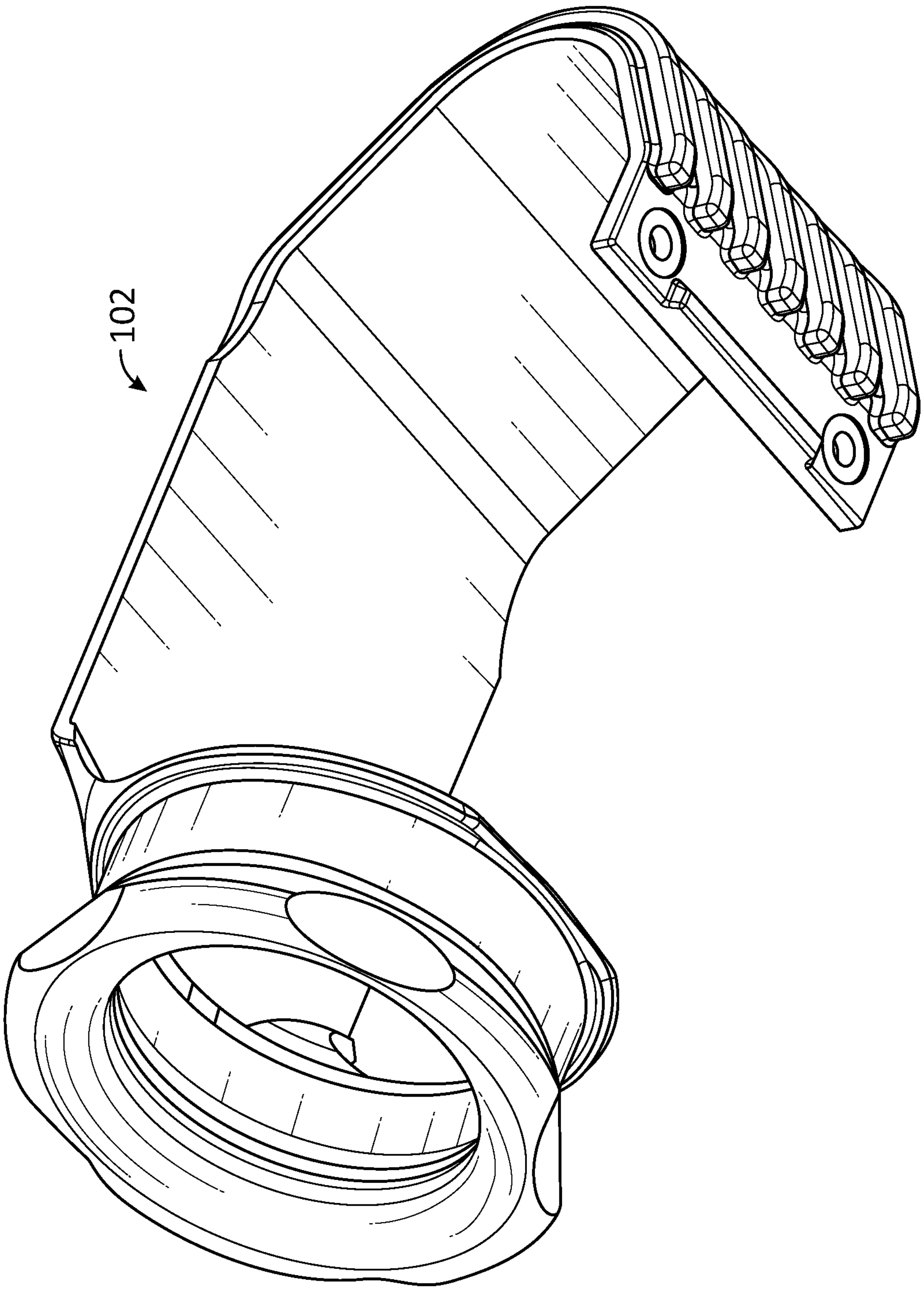
Figure 25:
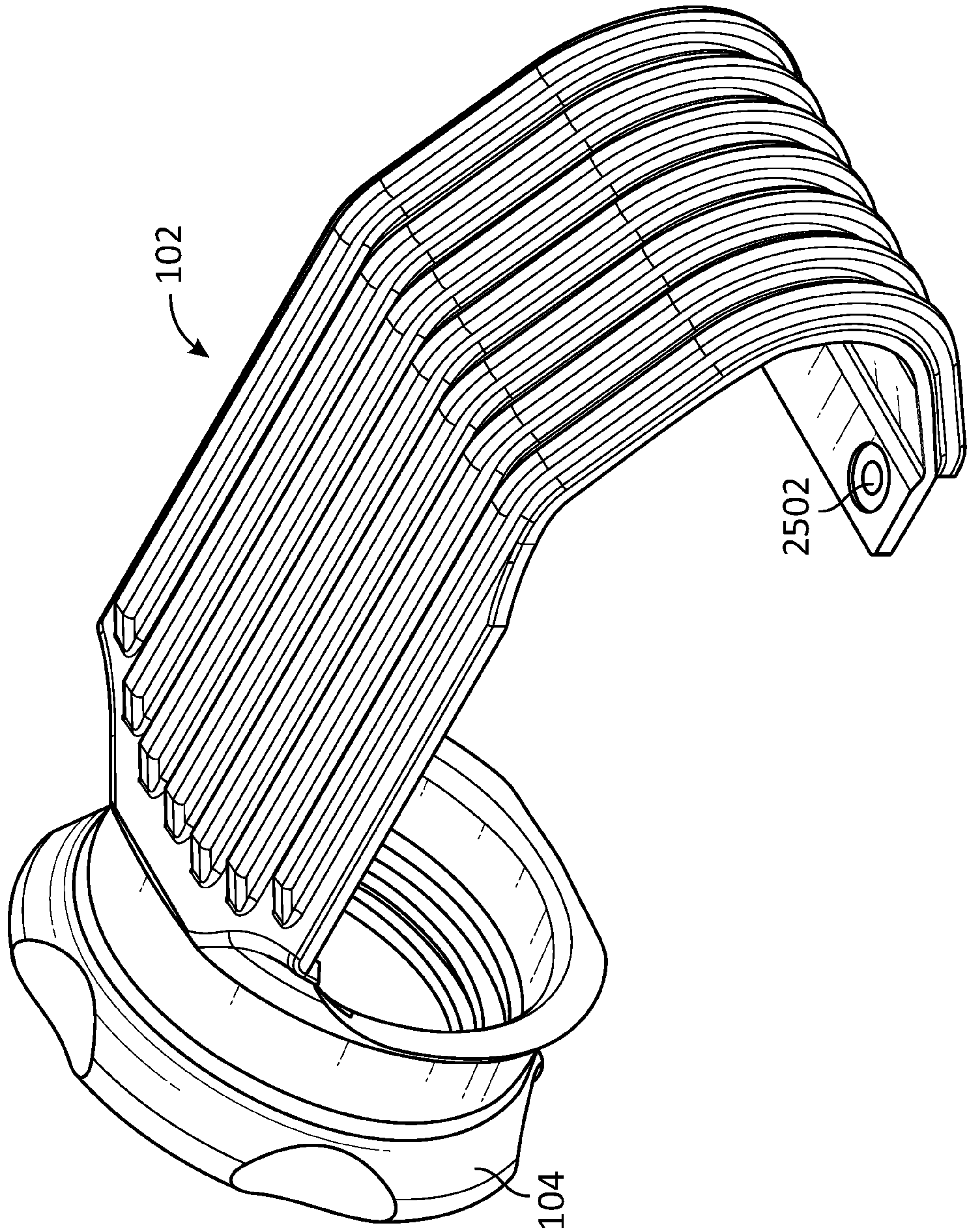

Now referring to FIGS. 21A and 21B, various perspective views of lighting device 100 and switch assembly 200 attached to equipment 2101 (e.g., a ballistic shield and/or other type of equipment as appropriate) having a mounting member 2100 in accordance with an embodiment of the present disclosure are shown. In several embodiments, lighting device 100 may be attached to ballistic shield at a first location (e.g., on mounting member 2100) using a clamp assembly, which may include moveable fasteners 112 and opposing pad 116. Switch assembly 200 may be attached to equipment 2101 at a second location on equipment 2101. Remote switch assembly 200 may be positioned for convenient access by a user of equipment 2101 to aid the user in controlling lighting device 100 while the user also handles equipment 2101. Cable 210 of switch assembly 200 may be anything length so that switch assembly 200 can be positioned at any location on equipment 2101. In some embodiments, cable 210 may be attached (e.g., taped, adhered, fastened, and so on) to a surface of ballistic shield to avoid cable from catching on the user and/or the external environment.

In various embodiments, casing 202 of switch assembly 200 may be attached to a grip or handle of equipment 2101 using, for example, an adhesive (e.g., rubber cement, hooks and loops, and so on). Grip may provide a convenient resting location for a hand of the user of equipment 2101, thus, the user may conveniently actuate remote switch 216 (e.g., by way of the user's thumb or finger) while the grip. In another embodiment, grip may include one or more switches which may be connected to lighting device 100 for controlling lighting device 100.

Now referring to FIGS. 22-25, various views of cover 102 in accordance with several embodiments of the present disclosure is shown. In one or more embodiments, lighting device 100 may include cover 102 secured to second end 154 (e.g., rear portion 106*c*) of housing 106 and configured to wrap from second end 154 (e.g., rear portion 106*c*) to first end 152 (e.g., front portion 106*a*) of housing 106. Cover 102 may then be wrapped about housing 106, where a bezel guard 104 may be pulled over at least a portion of optical assembly 122, as discussed further below herein. Cover 102 may be attached to housing 106 using, for example, screws 150 (shown in FIG. 8). Screws 150 may extend through holes 2502 of FIG. 23 to attach cover 102 to housing 106.

A bottom surface 2504 of cover 102 may face a top surface of housing 106. A top surface 2506 of cover 102 may provide ridges 128, as previously discussed in FIGS. 1-8. Ridges 128 may include one or more raised portions of top surface 2506 that provide peaks with grooves disposed therebetween. In some embodiments, ridges 128 may include longitudinal ridges that are substantially parallel relative to each other and longitudinal axis A of housing 106 when wrapped about housing 106. In other embodiments, ridges 128 may include horizontal ridges that are substantially parallel relative to each other and orthogonal relative to longitudinal axis A of housing 106 when wrapped about housing 106. Ridges 128 may include various designs, such as parallel lines, zig zags, concentric or adjacent circles, rectangles, triangles, or any other polygons, and the like.

Cover 102 may wrap around at least a portion of housing 106 and enclose at least a portion of optical assembly 122 to protect optical assembly 122. For instance, cover 102 may include sacrificial lens 158 disposed between optical assembly 122, such as a lens of optical assembly 122, and an external environment. Cover 102 may be readily replaced if cover 102 is damaged, as discussed in FIG. 26.

Figure 26:
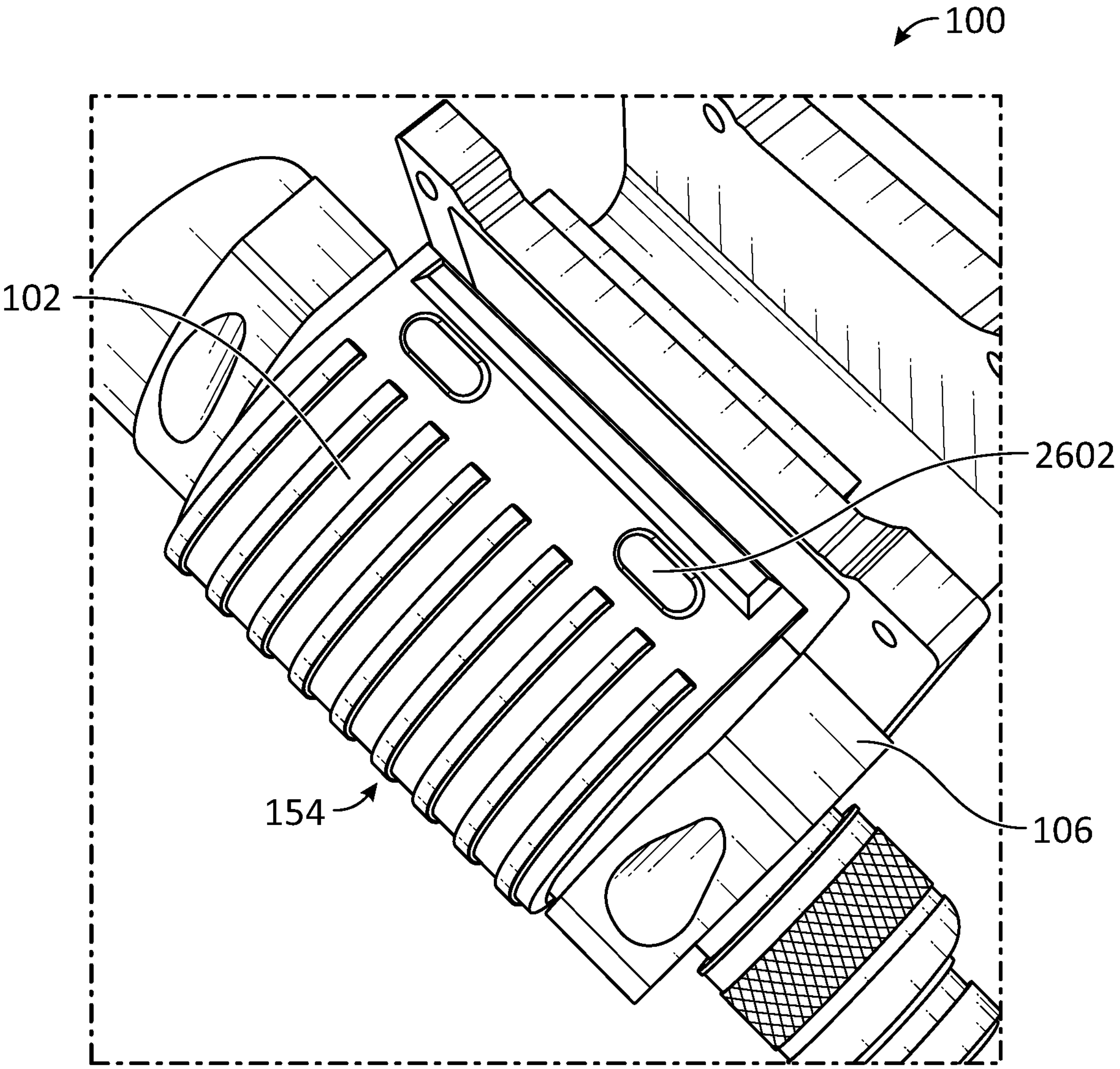
FIG. 26 illustrates a securing mechanism of the cover in accordance with an embodiment of the present disclosure.

Now referring to FIG. 26, a securing mechanism of the cover 102 to the lighting device 100 device in accordance with an embodiment of the present disclosure is shown. Cover 102 may be attached to housing 106 using various types of attachment components. For instance, cover 102 may be attached to the second end of housing 106 using one or more pins, screws 150, notches, tabs 2602, and the like. In some embodiments, tabs 2602 may include oval-shaped tabs that may extend through complementary holes in cover 102 to secure cover 102 to housing 106, as illustrated in FIG. 26.

Figure 27:
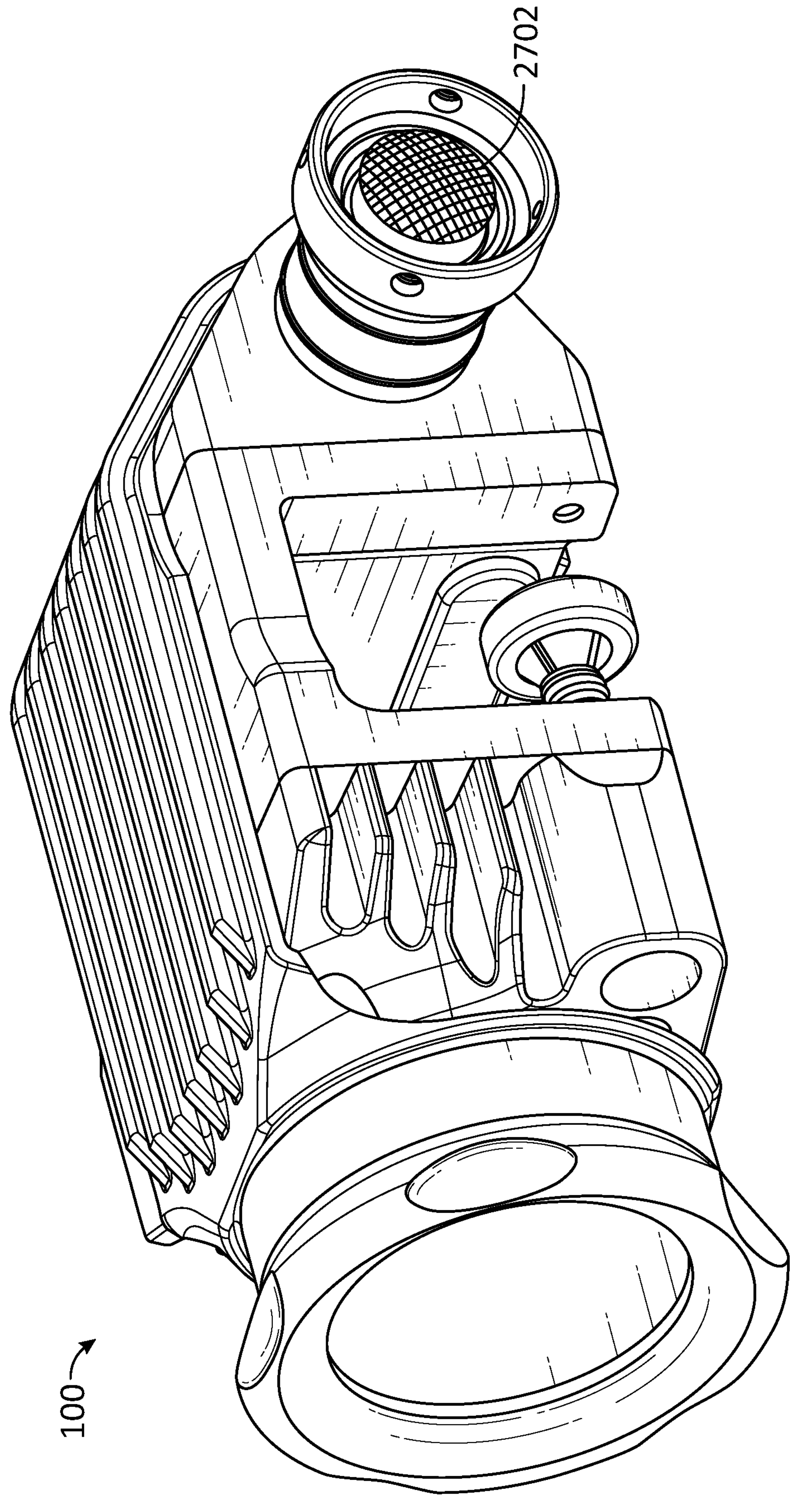
FIGS. 27 and 28 illustrate a lighting device with various types of tail caps in accordance with several embodiments of the present disclosure.
Figure 28:
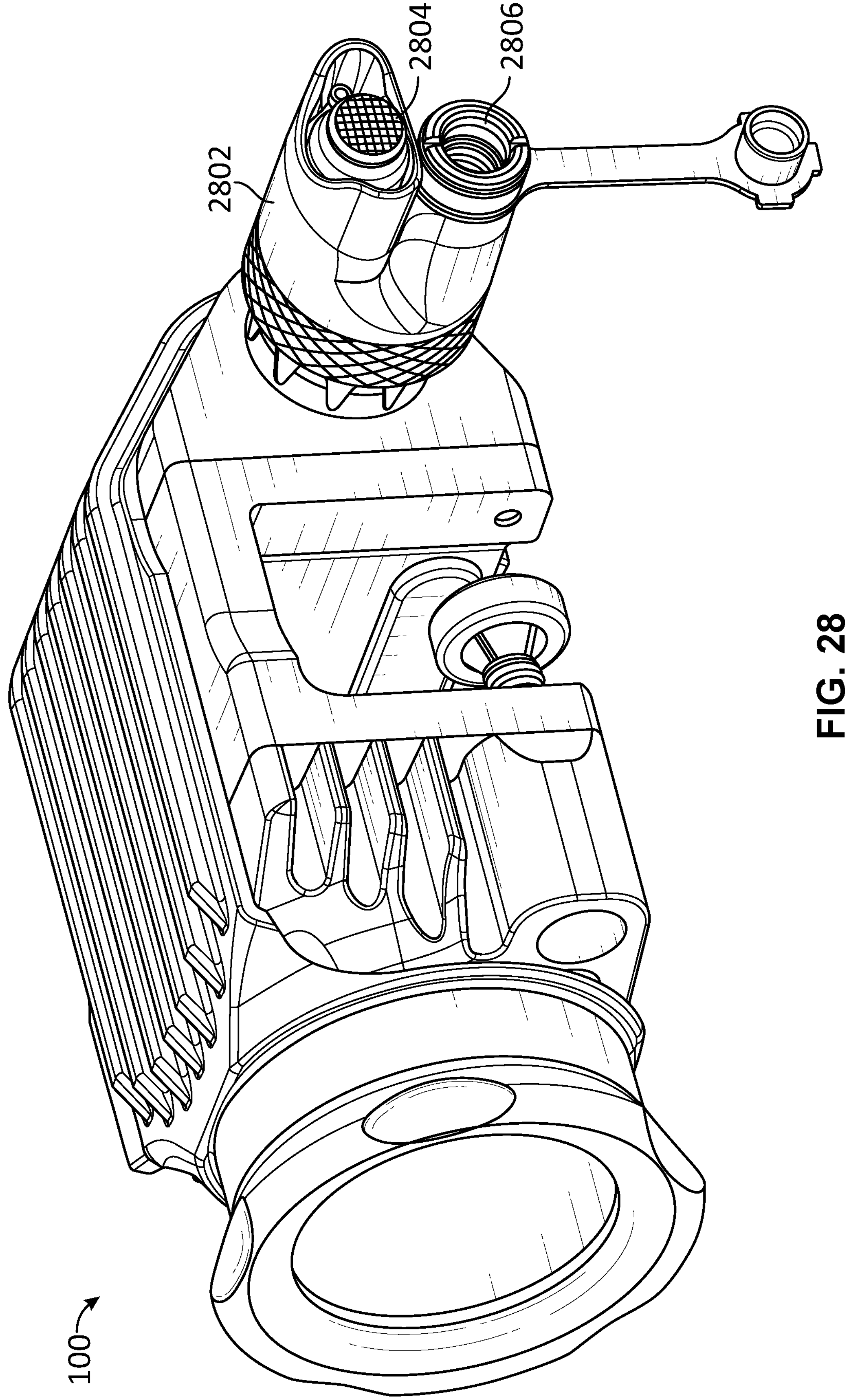

Now referring to FIGS. 27 and 28, a lighting device with various types of tail caps in accordance with several embodiments of the present disclosure is shown. As shown in FIGS. 27 and 28, lighting device 100 may include interchangeable user controls. As previously mentioned, user control may include interchangeable tail cap 110. Tail cap 110 may include a socket tail cap (shown in FIGS. 1-8), a dome switch 2702 (shown in FIG. 27), a combination tail cap (shown in FIG. 28), and so on. For example, as shown in FIG. 27, user control may include a dome switch 2702 may be provided on external surface of lighting device, such as, for example, on rear portion 106*c* of housing 106, to control lighting device 100. In several embodiments, dome switch 2702 may be used to operate lighting device 100. For instance, dome switch 2702 may be configured to switch lighting device 100 on and off in accordance with various modes of operation. For example, dome switch 2702 may operate with other circuitry (shown in FIG. 9) to select a momentary on mode, where lighting device 100 provides light while dome switch 2702 is held (e.g., indented or depressed) in an on position by the user, a constant on mode, where lighting device 100 continues to provide light after dome switch 2702 has been depressed and released (e.g., dome switch has been twice depressed and released in quick succession by the user), and a flashlight mode, where lighting device 100 may be used as a flashlight (e.g., when lighting device 100 is detached from mounting member 101).

Modes of operation of lighting device may include modes that vary light level outputs, wavelengths, temporal characteristics (e.g., strobe, momentary, or constant light output), and the like. For instance, lighting device 100 may also include a rotary switch (not shown) which may be used to select various levels of light output (e.g., low, medium, and high as indicated by the labels such as "LOW," "MED," and "HIGH"). Light output may include infrared light output, visible light output, ultraviolet light output, and/or so on.

As shown in FIG. 28, tail cap may include combination tail cap 2802. Combination tail cap 2802 may include a dome switch 2804 and a socket 2806, thus, allowing the user to operate lighting device 100 directly using dome switch 2804 or remotely using switch assembly 200. Socket 2806 (e.g., a connector) may be configured to receive plug 212 of switch 216 to connect switch 216 or other switches to lighting device 100 in the manner shown in FIG. 21A.

Figure 29:
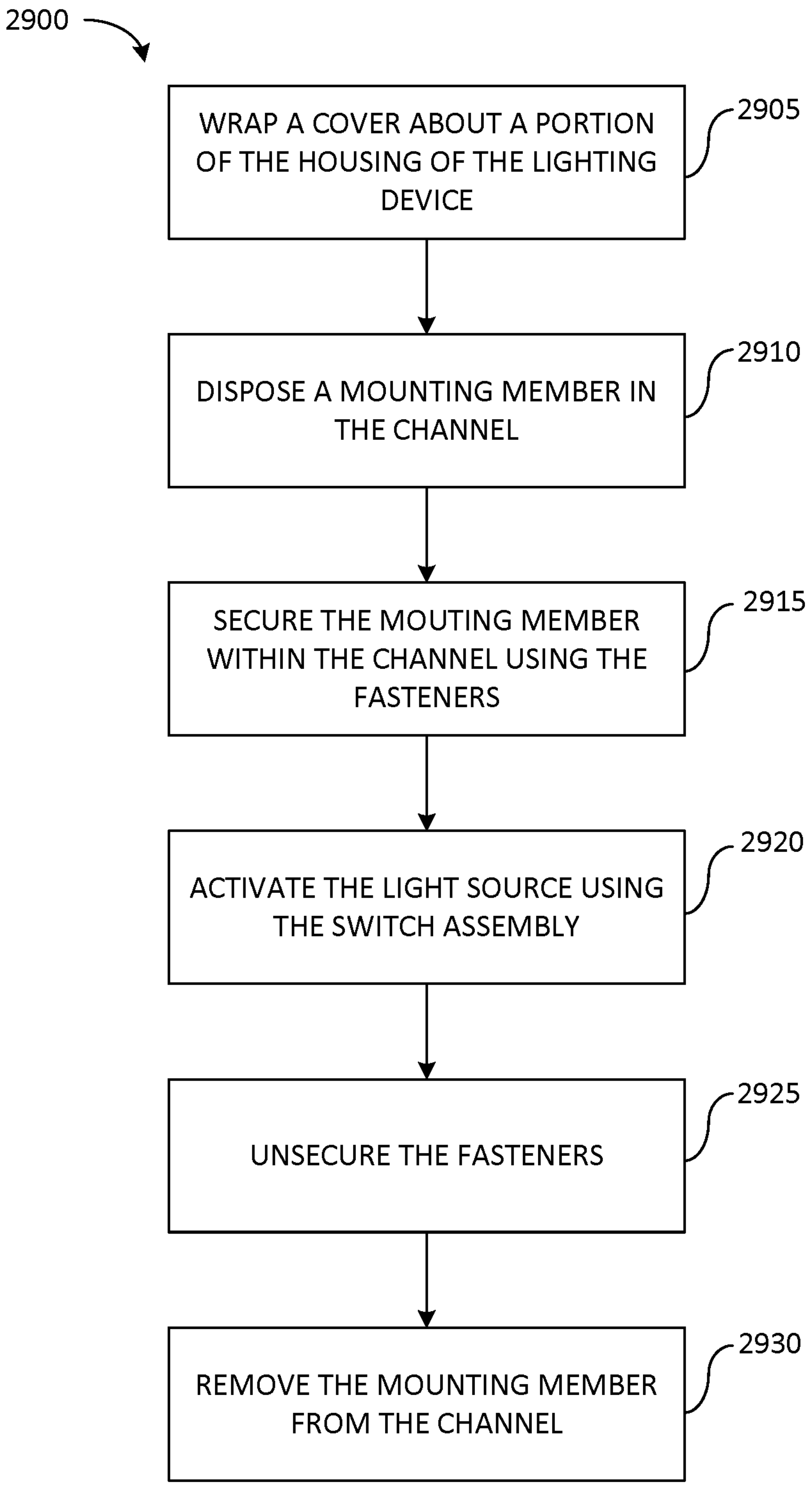
FIG. 29 illustrates a flowchart for a process of using a lighting device in accordance with an embodiment of the present disclosure.

FIG. 29 illustrates a flowchart of a process 2900 of using a lighting device in accordance with an embodiment of the present disclosure is shown. For explanatory purposes, process 2900 is primarily described within this disclosure with reference to lighting device 100 and its associated arrangement of components as described in FIGS. 1-28. However, process 2900 is not limited to such implementations. Any step, sub-step, sub-process, or block of process 2900 may be performed in an order or arrangement different from the embodiments illustrated in FIG. 29; some may be omitted, others may be added, and some may be performed simultaneously as appropriate.

As shown at block 2905, process 2900 may include wrapping cover 102 about a portion of housing 106 of lighting device 100.

As shown in block 2910, process 2900 may include disposing mounting member 2100 in channel 126. More specifically, process 2900 may include disposing mounting member 2100 in channel 126 of housing 106 of lighting device 100, where channel 126 is defined by first and second opposed surfaces 142,144 of housing 106.

In one or more embodiments, housing 106 may include a modular housing. Modular housing may include front portion 106*a* that secures to optical assembly 122 and center portion 106*b*, which includes channel 126.

In various embodiments, housing 106 may include a plurality of fins 140 configured to operate as heat sinks for lighting device 100.

In various embodiments, optical assembly 122 is secured to first end 152 of housing 106. Process 2900 may further include wrapping cover 102, which is secured to second end 154 of housing 106, from second end 154 to first end 152 and enclosing at least a portion of optical assembly 122 to protect optical assembly 122. Cover 102 may include sacrificial lens 158 disposed between optical assembly 122 and an external environment. Cover 102 may include bezel guard 104 that extends laterally and/or longitudinally away from optical assembly 122 (e.g., sacrificial lens 158).

As shown in block 2915, process 2900 may include securing mounting member 2100 within channel 126 using one or more fasteners 112. Securing mounting member 2100 may include extending one or more fasteners from first surface 142 and/or second surface 144 to bias against mounting member 2100 and secure mounting member 2100 in channel 126. In one or more embodiments, first surface 142 and/or second surface 144 of channel 126 may include an opposing pad 116 (e.g., pad 116 may be disposed on and/or attached to first surface 142 and/or second surface 144). Process 2900 may include biasing mounting member 101 by opposing pad 116 (e.g., elongated pad) disposed on first surface 142 and/or second surface 144 of channel 126 to further secure mounting member 101 in channel 126.

In one or more embodiments, mounting member 2100 may include a portion of a ballistic shield such that the one or more fasteners 112 may selectively secure lighting device 100 to the portion of the ballistic shield to provide dynamic and durable lighting during use of the ballistic shield.

As shown in block 2920, process 2900 may include activating light source 168 of lighting device 100 using switch assembly 200. In one or more embodiments, lighting device 100 may further include switch assembly 200, which includes switch 216 configured to selectively adjust a mode of operation of light source 168, casing 202 configured to receive switch 216 therein, pin 220, and actuator 204, which includes a slot 222 configured to receive pin 220 to connect actuator 204 to casing 202. In some embodiments, process 2900 may further include receiving a depression at actuator 204 from a user, and translating actuator 204 relative to pin 220 in response to the depression to actuate switch 216.

In one or more embodiments, process 2900 may include operating lighting device 100, where switch 216 is communicatively connected to lighting device 100, and the process includes depressing actuator 204 to operate switch 216 to adjust the mode of operation of the light source 168. As previously mentioned herein, adjusting a mode of operation of light source 168 may include turning light source 168 on or off, altering a type of light source used, altering an outputted wavelength, and the like.

In various embodiments, fastener 112 may include a threaded interface configured to engage a complementary threaded interface of a bore of housing 106. For instance, fastener 112 may be at least partially disposed within a bore of front portion 106*a* and translated within bore by a rotation of fastener 112.

As shown in block 2925, process 2900 may include disengaging fasteners 112. In some embodiments, fasteners 112 may be disengaged by rotating fasteners 112 in a second direction to translate fasteners 112 away from mounting member 2100 (e.g., toward first surface 142).

As shown in block 2930, process 2900 may include removing mounting member 2100 from channel 126. In various embodiments, process 2900 may further include selectively replacing center portion 106*b* to adjust a size of channel 126.

Embodiments are not limited to use in tactical mounted lighting devices. Discussion herein of equipment mounting is by way of example only and not by way of limitation. Embodiments may be configured for use with flashlights, weapons (such as rifles and pistols), helmet, vehicles, and so on. Indeed, embodiments may be used with any desired device. Thus, embodiments may provide light source switching for a variety of different applications.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A lighting device comprising:

a housing comprising a channel defined by first and second opposed surfaces of the housing, wherein the channel is configured to receive a mounting member therein, wherein the mounting member is a portion of a shield;

one or more fasteners extending from the first surface and/or the second surface and configured to bias against the mounting member to secure the mounting member in the channel; and an optical assembly secured to the housing and comprising a light source.

2. The lighting device of claim 1, wherein the one or more fasteners extend from the first surface and are configured to bias the mounting member against the second surface to further secure the mounting member in the channel.

3. The lighting device of claim 1, wherein the shield is a ballistic shield such that the one or more fasteners selectively secure the lighting device to the portion of the ballistic shield to provide dynamic and durable lighting during use of the ballistic shield.

4. The lighting device of claim 1, wherein:

the optical assembly is secured to a first end of the housing; and the lighting device further comprises a cover secured to a second end of the housing and configured to wrap from the second end to the first end and enclose at least a portion of the optical assembly to protect the optical assembly.

5. The lighting device of claim 4, wherein the cover comprises:

a sacrificial lens disposed between the optical assembly and an external environment; and a bezel guard that extends laterally and/or longitudinally away from the optical assembly.

6. The lighting device of claim 1, wherein the housing is a modular housing comprising:

a front portion that secures to the optical assembly;

a center portion comprising the channel; and wherein the center portion is configured to be selectively replaced to adjust a size of the channel.

7. The lighting device of claim 1, wherein the housing comprises a plurality of fins configured to operate as heat sinks for the lighting device.

8. The lighting device of claim 1, further comprising an elongated pad disposed on the second surface, wherein the elongated pad is configured to bias the mounting member to further secure the mounting member in the channel.

9. The lighting device of claim 1, further comprising a switch assembly comprising:

a switch configured to selectively adjust a mode of operation of the light source;

a casing configured to receive the switch therein;

a pin;

an actuator comprising a slot configured to receive the pin to connect the actuator to the casing; and wherein the actuator is configured to receive a depression from a user and translate relative to the pin in response to the depression to actuate the switch.

10. A method of operating the lighting device of claim 9, wherein the switch is communicatively connected to the lighting device, the method comprising:

depressing the actuator to operate the switch to adjust the mode of operation of the light source.

11. A method comprising:

disposing a mounting member in a channel of a housing of a lighting device, wherein the mounting member is a portion of a shield, wherein the channel is defined by first and second opposed surfaces of the housing;

extending one or more fasteners from the first surface and/or second surface to bias against the mounting member to secure the mounting member in the channel; and wherein the lighting device comprises an optical assembly secured to the housing and comprising a light source.

12. The method of claim 11, wherein:

the one or more fasteners extend from the first surface; and the extending causes the one or more fasteners to bias the mounting member against the second surface to further secure the mounting member in the channel.

13. The method of claim 11, wherein the shield is a ballistic shield such that the one or more fasteners selectively secure the lighting device to the portion of the ballistic shield to provide dynamic and durable lighting during use of the ballistic shield.

14. The method of claim 11, wherein:

the optical assembly is secured to a first end of the housing; and the method further comprises wrapping a cover secured to a second end of the housing from the second end to the first end and enclosing at least a portion of the optical assembly to protect the optical assembly.

15. The method of claim 14, wherein the cover comprises:

a sacrificial lens disposed between the optical assembly and an external environment; and a bezel guard that extends laterally and/or longitudinally away from the optical assembly.

16. The method of claim 11, wherein the housing is a modular housing comprising:

a front portion that secures to the optical assembly; and a center portion comprising the channel; and wherein the method further comprises selectively replacing the center portion to adjust a size of the channel.

17. The method of claim 11, wherein the housing comprises a plurality of fins configured to operate as heat sinks for the lighting device.

18. The method of claim 11, further comprising biasing the mounting member by an elongated pad disposed on the second surface of the channel to further secure the mounting member in the channel.

19. The method of claim 11, wherein:

the lighting device further comprises:

a switch configured to selectively adjust a mode of operation of the light source, a casing configured to receive the switch therein, a pin, and an actuator comprising a slot configured to receive the pin to connect the actuator to the casing; and the method further comprises:

receiving a depression at the actuator from a user, and translating the actuator relative to the pin in response to the depression to actuate the switch.

20. The method of claim 19, wherein the switch is communicatively connected to the lighting device, the method further comprising:

depressing the actuator to operate the switch to adjust the mode of operation of the light source.

* * * * *